United States Patent
Fachan

(10) Patent No.: US 8,625,464 B2
(45) Date of Patent: *Jan. 7, 2014

(54) SYSTEMS AND METHODS FOR PROVIDING A QUIESCING PROTOCOL

(75) Inventor: Neal T. Fachan, Seattle, WA (US)

(73) Assignee: EMC Corporation, Hopkinton, MA (US)

( * ) Notice: Subject to any disclaimer, the term of this patent is extended or adjusted under 35 U.S.C. 154(b) by 289 days.

This patent is subject to a terminal disclaimer.

(21) Appl. No.: 12/917,180

(22) Filed: Nov. 1, 2010

(65) Prior Publication Data

US 2011/0044209 A1 Feb. 24, 2011

Related U.S. Application Data

(63) Continuation of application No. 11/357,740, filed on Feb. 17, 2006, now Pat. No. 7,848,261.

(51) Int. Cl.
*H04L 12/28* (2006.01)

(52) U.S. Cl.
USPC ............................. 370/255; 709/221; 709/232

(58) Field of Classification Search
None
See application file for complete search history.

(56) References Cited

U.S. PATENT DOCUMENTS

| | | |
|---|---|---|
| 4,608,688 A | 8/1986 | Hansen et al. |
| 4,780,796 A | 10/1988 | Fukuda et al. |
| 5,163,131 A | 11/1992 | Row et al. |
| 5,181,162 A | 1/1993 | Smith et al. |
| 5,212,784 A | 5/1993 | Sparks |
| 5,230,047 A | 7/1993 | Frey et al. |
| 5,251,206 A | 10/1993 | Calvignac et al. |
| 5,258,984 A | 11/1993 | Menon et al. |
| 5,329,626 A | 7/1994 | Klein et al. |
| 5,359,594 A | 10/1994 | Gould et al. |
| 5,403,639 A | 4/1995 | Belsan et al. |
| 5,423,046 A | 6/1995 | Nunnelley et al. |
| 5,459,871 A | 10/1995 | Van Den Berg |
| 5,481,699 A | 1/1996 | Saether |
| 5,504,900 A | 4/1996 | Raz |
| 5,548,724 A | 8/1996 | Akizawa et al. |
| 5,548,795 A | 8/1996 | Au |
| 5,568,629 A | 10/1996 | Gentry et al. |
| 5,596,709 A | 1/1997 | Bond et al. |

(Continued)

FOREIGN PATENT DOCUMENTS

| | | |
|---|---|---|
| EP | 0774723 | 5/1997 |
| EP | 1421520 | 5/2004 |

(Continued)

OTHER PUBLICATIONS

Nov. 15, 2002 Int'l Search report PCT/US02/24728, 2 pages.

(Continued)

*Primary Examiner* — Yemane Mesfin
*Assistant Examiner* — Khoa Huynh
(74) *Attorney, Agent, or Firm* — Knobbe, Martens, Olson & Bear, LLP

(57) ABSTRACT

The systems and methods of the present invention provide a quiescing protocol. In one embodiment, nodes of a system utilize the protocol to complete processing until they reach a consistent state. In one embodiment, a coordinator initiates the quiescing process and the nodes communicate with each other to determine whether their messages have been processed and communicate with the coordinator to determine when all of the messages have been processed.

18 Claims, 13 Drawing Sheets

(56) References Cited

U.S. PATENT DOCUMENTS

| | | |
|---|---|---|
| 5,606,669 A | 2/1997 | Bertin et al. |
| 5,612,865 A | 3/1997 | Dasgupta |
| 5,649,200 A | 7/1997 | Leblang et al. |
| 5,657,439 A | 8/1997 | Jones et al. |
| 5,668,943 A | 9/1997 | Attanasio et al. |
| 5,680,621 A | 10/1997 | Korenshtein |
| 5,694,593 A | 12/1997 | Baclawski |
| 5,696,895 A | 12/1997 | Hemphill et al. |
| 5,734,826 A | 3/1998 | Olnowich et al. |
| 5,754,756 A | 5/1998 | Watanabe et al. |
| 5,761,659 A | 6/1998 | Bertoni |
| 5,774,643 A | 6/1998 | Lubbers et al. |
| 5,799,305 A | 8/1998 | Bortvedt et al. |
| 5,805,578 A | 9/1998 | Stirpe et al. |
| 5,805,900 A | 9/1998 | Fagen et al. |
| 5,806,065 A | 9/1998 | Lomet |
| 5,822,790 A | 10/1998 | Mehrotra |
| 5,832,200 A | 11/1998 | Yoda |
| 5,862,312 A | 1/1999 | Mann |
| 5,870,563 A | 2/1999 | Roper et al. |
| 5,878,410 A | 3/1999 | Zbikowski et al. |
| 5,878,414 A | 3/1999 | Hsiao et al. |
| 5,884,046 A | 3/1999 | Antonov |
| 5,884,098 A | 3/1999 | Mason, Jr. |
| 5,884,303 A | 3/1999 | Brown |
| 5,890,147 A | 3/1999 | Peltonen et al. |
| 5,917,998 A | 6/1999 | Cabrera et al. |
| 5,933,834 A | 8/1999 | Aichelen |
| 5,943,690 A | 8/1999 | Dorricott et al. |
| 5,963,963 A | 10/1999 | Schmuck et al. |
| 5,966,707 A | 10/1999 | Van Huben et al. |
| 5,983,232 A | 11/1999 | Zhang |
| 5,996,089 A | 11/1999 | Mann |
| 6,000,007 A | 12/1999 | Leung et al. |
| 6,014,669 A | 1/2000 | Slaughter et al. |
| 6,021,414 A | 2/2000 | Fuller |
| 6,029,168 A | 2/2000 | Frey |
| 6,038,570 A | 3/2000 | Hitz et al. |
| 6,044,367 A | 3/2000 | Wolff |
| 6,052,759 A | 4/2000 | Stallmo et al. |
| 6,055,543 A | 4/2000 | Christensen et al. |
| 6,055,564 A | 4/2000 | Phaal |
| 6,070,172 A | 5/2000 | Lowe |
| 6,081,833 A | 6/2000 | Okamoto et al. |
| 6,081,883 A | 6/2000 | Popelka et al. |
| 6,108,759 A | 8/2000 | Orcutt et al. |
| 6,117,181 A | 9/2000 | Dearth et al. |
| 6,122,754 A | 9/2000 | Litwin et al. |
| 6,136,176 A | 10/2000 | Wheeler et al. |
| 6,138,126 A | 10/2000 | Hitz et al. |
| 6,154,854 A | 11/2000 | Stallmo |
| 6,169,972 B1 | 1/2001 | Kono et al. |
| 6,173,374 B1 | 1/2001 | Heil et al. |
| 6,202,085 B1 | 3/2001 | Benson et al. |
| 6,209,059 B1 | 3/2001 | Ofer et al. |
| 6,219,693 B1 | 4/2001 | Napolitano et al. |
| 6,226,377 B1 | 5/2001 | Donaghue, Jr. |
| 6,247,108 B1 | 6/2001 | Long |
| 6,279,007 B1 | 8/2001 | Uppala |
| 6,321,345 B1 | 11/2001 | Mann |
| 6,334,168 B1 | 12/2001 | Islam et al. |
| 6,334,966 B1 | 1/2002 | Hahn et al. |
| 6,353,823 B1 | 3/2002 | Kumar |
| 6,384,626 B2 | 5/2002 | Tsai et al. |
| 6,385,626 B1 | 5/2002 | Tamer et al. |
| 6,393,483 B1 | 5/2002 | Latif et al. |
| 6,397,311 B1 | 5/2002 | Capps |
| 6,405,219 B2 | 6/2002 | Saether et al. |
| 6,408,313 B1 | 6/2002 | Campbell et al. |
| 6,415,259 B1 | 7/2002 | Wolfinger et al. |
| 6,421,781 B1 | 7/2002 | Fox et al. |
| 6,434,574 B1 | 8/2002 | Day et al. |
| 6,449,730 B2 | 9/2002 | Mann |
| 6,453,389 B1 | 9/2002 | Weinberger et al. |
| 6,457,139 B1 | 9/2002 | D'Errico et al. |
| 6,463,442 B1 | 10/2002 | Bent et al. |
| 6,478,429 B1 | 11/2002 | Aritake et al. |
| 6,487,208 B1 * | 11/2002 | Chirashnya et al. .......... 370/400 |
| 6,496,842 B1 | 12/2002 | Lyness |
| 6,499,091 B1 | 12/2002 | Bergsten |
| 6,502,172 B2 | 12/2002 | Chang |
| 6,502,174 B1 | 12/2002 | Beardsley et al. |
| 6,523,130 B1 | 2/2003 | Hickman et al. |
| 6,526,478 B1 | 2/2003 | Kirby |
| 6,546,443 B1 | 4/2003 | Kakivaya et al. |
| 6,549,513 B1 | 4/2003 | Chao et al. |
| 6,557,114 B2 | 4/2003 | Mann |
| 6,567,894 B1 | 5/2003 | Hsu et al. |
| 6,567,926 B2 | 5/2003 | Mann |
| 6,571,244 B1 | 5/2003 | Larson |
| 6,571,349 B1 | 5/2003 | Mann |
| 6,574,745 B2 | 6/2003 | Mann |
| 6,594,655 B2 | 7/2003 | Tal et al. |
| 6,594,660 B1 | 7/2003 | Berkowitz et al. |
| 6,594,744 B1 | 7/2003 | Humlicek et al. |
| 6,598,174 B1 | 7/2003 | Parks et al. |
| 6,618,798 B1 | 9/2003 | Burton et al. |
| 6,631,411 B1 | 10/2003 | Welter et al. |
| 6,658,554 B1 | 12/2003 | Moshovos et al. |
| 6,662,184 B1 | 12/2003 | Friedberg |
| 6,668,304 B1 | 12/2003 | Satran et al. |
| 6,671,686 B2 | 12/2003 | Pardon et al. |
| 6,671,704 B1 | 12/2003 | Gondi et al. |
| 6,671,772 B1 | 12/2003 | Cousins |
| 6,687,805 B1 | 2/2004 | Cochran |
| 6,725,392 B1 | 4/2004 | Frey et al. |
| 6,732,125 B1 | 5/2004 | Autrey et al. |
| 6,742,020 B1 | 5/2004 | Dimitroff et al. |
| 6,748,429 B1 | 6/2004 | Talluri et al. |
| 6,801,949 B1 | 10/2004 | Bruck et al. |
| 6,848,029 B2 | 1/2005 | Coldewey |
| 6,856,591 B1 | 2/2005 | Ma et al. |
| 6,871,295 B2 | 3/2005 | Ulrich et al. |
| 6,895,482 B1 | 5/2005 | Blackmon et al. |
| 6,895,534 B2 | 5/2005 | Wong et al. |
| 6,907,011 B1 * | 6/2005 | Miller et al. .................. 370/254 |
| 6,907,520 B2 | 6/2005 | Parady |
| 6,917,942 B1 | 7/2005 | Burns et al. |
| 6,920,494 B2 | 7/2005 | Heitman et al. |
| 6,922,696 B1 | 7/2005 | Lincoln et al. |
| 6,922,708 B1 | 7/2005 | Sedlar |
| 6,934,878 B2 | 8/2005 | Massa et al. |
| 6,940,966 B2 | 9/2005 | Lee |
| 6,954,435 B2 | 10/2005 | Billhartz et al. |
| 6,990,604 B2 | 1/2006 | Binger |
| 6,990,611 B2 | 1/2006 | Busser |
| 7,007,044 B1 | 2/2006 | Rafert et al. |
| 7,007,097 B1 | 2/2006 | Huffman et al. |
| 7,010,622 B1 | 3/2006 | Bauer et al. |
| 7,017,003 B2 | 3/2006 | Murotani et al. |
| 7,043,485 B2 | 5/2006 | Manley et al. |
| 7,043,567 B2 | 5/2006 | Trantham |
| 7,058,639 B1 | 6/2006 | Chatterjee et al. |
| 7,069,320 B1 | 6/2006 | Chang et al. |
| 7,103,597 B2 | 9/2006 | McGoveran |
| 7,111,305 B2 | 9/2006 | Solter et al. |
| 7,113,938 B2 | 9/2006 | Highleyman et al. |
| 7,124,264 B2 | 10/2006 | Yamashita |
| 7,146,524 B2 | 12/2006 | Patel et al. |
| 7,152,182 B2 | 12/2006 | Ji et al. |
| 7,165,192 B1 | 1/2007 | Cadieux et al. |
| 7,177,295 B1 | 2/2007 | Sholander et al. |
| 7,181,746 B2 | 2/2007 | Perycz et al. |
| 7,184,421 B1 | 2/2007 | Liu et al. |
| 7,194,487 B1 | 3/2007 | Kekre et al. |
| 7,206,805 B1 | 4/2007 | McLaughlin, Jr. |
| 7,225,204 B2 | 5/2007 | Manley et al. |
| 7,228,299 B1 | 6/2007 | Harmer et al. |
| 7,240,235 B2 | 7/2007 | Lewalski-Brechter |
| 7,249,118 B2 | 7/2007 | Sandler et al. |
| 7,257,257 B2 | 8/2007 | Anderson et al. |
| 7,290,056 B1 | 10/2007 | McLaughlin, Jr. |
| 7,313,614 B2 | 12/2007 | Considine et al. |
| 7,318,134 B1 | 1/2008 | Oliveira et al. |

(56) References Cited

U.S. PATENT DOCUMENTS

| | | |
|---|---|---|
| 7,346,720 B2 | 3/2008 | Fachan |
| 7,370,064 B2 | 5/2008 | Yousefi'zadeh |
| 7,373,426 B2 | 5/2008 | Jinmei et al. |
| 7,386,610 B1 | 6/2008 | Vekiarides |
| 7,386,675 B2 | 6/2008 | Fachan |
| 7,386,697 B1 | 6/2008 | Case et al. |
| 7,389,379 B1 | 6/2008 | Goel et al. |
| 7,440,966 B2 | 10/2008 | Adkins et al. |
| 7,451,341 B2 | 11/2008 | Okaki et al. |
| 7,502,801 B2 | 3/2009 | Sawdon et al. |
| 7,509,448 B2 | 3/2009 | Fachan et al. |
| 7,509,524 B2 | 3/2009 | Patel et al. |
| 7,533,298 B2 | 5/2009 | Smith et al. |
| 7,536,588 B2 | 5/2009 | Hafner et al. |
| 7,546,354 B1 | 6/2009 | Fan et al. |
| 7,546,412 B2 | 6/2009 | Ahmad et al. |
| 7,551,572 B2 | 6/2009 | Passey et al. |
| 7,558,910 B2 | 7/2009 | Alverson et al. |
| 7,571,348 B2 | 8/2009 | Deguchi et al. |
| 7,577,258 B2 | 8/2009 | Wiseman et al. |
| 7,577,667 B2 | 8/2009 | Hinshaw et al. |
| 7,590,652 B2 | 9/2009 | Passey et al. |
| 7,593,938 B2 | 9/2009 | Lemar et al. |
| 7,596,713 B2 | 9/2009 | Mani-Meitav et al. |
| 7,617,289 B2 | 11/2009 | Srinivasan et al. |
| 7,631,066 B1 | 12/2009 | Schatz et al. |
| 7,639,818 B2 | 12/2009 | Fujimoto et al. |
| 7,665,123 B1 | 2/2010 | Szor et al. |
| 7,676,691 B2 | 3/2010 | Fachan et al. |
| 7,680,836 B2 | 3/2010 | Anderson et al. |
| 7,680,842 B2 | 3/2010 | Anderson et al. |
| 7,685,126 B2 | 3/2010 | Patel et al. |
| 7,685,162 B2 | 3/2010 | Heider et al. |
| 7,689,597 B1 | 3/2010 | Bingham et al. |
| 7,707,193 B2 | 4/2010 | Zayas et al. |
| 7,716,262 B2 | 5/2010 | Pallapotu |
| 7,734,603 B1 | 6/2010 | McManis |
| 7,739,288 B2 | 6/2010 | Lemar et al. |
| 7,743,033 B2 | 6/2010 | Patel et al. |
| 7,752,226 B1 | 7/2010 | Harmer et al. |
| 7,752,402 B2 | 7/2010 | Fachan et al. |
| 7,756,898 B2 | 7/2010 | Passey et al. |
| 7,779,048 B2 | 8/2010 | Fachan et al. |
| 7,783,666 B1 | 8/2010 | Zhuge et al. |
| 7,788,303 B2 | 8/2010 | Mikesell et al. |
| 7,797,283 B2 | 9/2010 | Fachan et al. |
| 7,797,323 B1 | 9/2010 | Eshghi et al. |
| 7,822,932 B2 | 10/2010 | Fachan et al. |
| 7,840,536 B1 | 11/2010 | Ahal et al. |
| 7,844,617 B2 | 11/2010 | Lemar et al. |
| 7,848,261 B2 | 12/2010 | Fachan |
| 7,870,345 B2 | 1/2011 | Daud et al. |
| 7,882,068 B2 | 2/2011 | Schack et al. |
| 7,882,071 B2 | 2/2011 | Fachan et al. |
| 7,899,800 B2 | 3/2011 | Fachan et al. |
| 7,900,015 B2 | 3/2011 | Fachan et al. |
| 7,917,474 B2 | 3/2011 | Passey et al. |
| 7,937,421 B2 | 5/2011 | Mikesell et al. |
| 7,949,636 B2 | 5/2011 | Akidau et al. |
| 7,949,692 B2 | 5/2011 | Lemar et al. |
| 7,953,704 B2 | 5/2011 | Anderson et al. |
| 7,953,709 B2 | 5/2011 | Akidau et al. |
| 7,962,779 B2 | 6/2011 | Patel et al. |
| 7,966,289 B2 | 6/2011 | Lu et al. |
| 7,971,021 B2 | 6/2011 | Daud et al. |
| 7,984,324 B2 | 7/2011 | Daud et al. |
| 8,005,865 B2 | 8/2011 | Passey et al. |
| 8,010,493 B2 | 8/2011 | Anderson et al. |
| 8,015,156 B2 | 9/2011 | Anderson et al. |
| 8,015,216 B2 | 9/2011 | Fachan et al. |
| 8,027,984 B2 | 9/2011 | Passey et al. |
| 8,051,425 B2 | 11/2011 | Godman et al. |
| 8,054,765 B2 | 11/2011 | Passey et al. |
| 8,055,711 B2 | 11/2011 | Fachan et al. |
| 8,060,521 B2 | 11/2011 | Lemar et al. |
| 8,082,379 B2 | 12/2011 | Fachan et al. |
| 8,112,395 B2 | 2/2012 | Patel et al. |
| 8,176,013 B2 | 5/2012 | Passey et al. |
| 8,181,065 B2 | 5/2012 | Fachan et al. |
| 8,195,905 B2 | 6/2012 | Fachan et al. |
| 8,200,632 B2 | 6/2012 | Schack et al. |
| 8,214,334 B2 | 7/2012 | Mikesell et al. |
| 8,214,400 B2 | 7/2012 | Fachan et al. |
| 8,238,350 B2 | 8/2012 | Godman et al. |
| 8,286,029 B2 | 10/2012 | Anderson et al. |
| 8,356,013 B2 | 1/2013 | Fachan et al. |
| 8,356,150 B2 | 1/2013 | Fachan et al. |
| 8,380,689 B2 | 2/2013 | Fachan et al. |
| 2001/0042224 A1 | 11/2001 | Stanfill et al. |
| 2001/0047451 A1 | 11/2001 | Noble et al. |
| 2001/0056492 A1 | 12/2001 | Bressoud et al. |
| 2002/0002661 A1 | 1/2002 | Blumenau et al. |
| 2002/0010696 A1 | 1/2002 | Izumi |
| 2002/0029200 A1 | 3/2002 | Dulin et al. |
| 2002/0035668 A1 | 3/2002 | Nakano et al. |
| 2002/0038436 A1 | 3/2002 | Suzuki |
| 2002/0049778 A1 | 4/2002 | Bell et al. |
| 2002/0055940 A1 | 5/2002 | Elkan |
| 2002/0072974 A1 | 6/2002 | Pugliese et al. |
| 2002/0075870 A1 | 6/2002 | de Azevedo et al. |
| 2002/0078161 A1 | 6/2002 | Cheng |
| 2002/0078180 A1 | 6/2002 | Miyazawa |
| 2002/0083078 A1 | 6/2002 | Pardon et al. |
| 2002/0083118 A1 | 6/2002 | Sim |
| 2002/0087366 A1 | 7/2002 | Collier et al. |
| 2002/0095438 A1 | 7/2002 | Rising et al. |
| 2002/0107877 A1 | 8/2002 | Whiting et al. |
| 2002/0124137 A1 | 9/2002 | Ulrich et al. |
| 2002/0138559 A1 | 9/2002 | Ulrich et al. |
| 2002/0156840 A1 | 10/2002 | Ulrich et al. |
| 2002/0156891 A1 | 10/2002 | Ulrich et al. |
| 2002/0156973 A1 | 10/2002 | Ulrich et al. |
| 2002/0156974 A1 | 10/2002 | Ulrich et al. |
| 2002/0156975 A1 | 10/2002 | Staub et al. |
| 2002/0158900 A1 | 10/2002 | Hsieh et al. |
| 2002/0161846 A1 | 10/2002 | Ulrich et al. |
| 2002/0161850 A1 | 10/2002 | Ulrich et al. |
| 2002/0161973 A1 | 10/2002 | Ulrich et al. |
| 2002/0163889 A1 | 11/2002 | Yemini et al. |
| 2002/0165942 A1 | 11/2002 | Ulrich et al. |
| 2002/0166026 A1 | 11/2002 | Ulrich et al. |
| 2002/0166079 A1 | 11/2002 | Ulrich et al. |
| 2002/0169827 A1 | 11/2002 | Ulrich et al. |
| 2002/0170036 A1 | 11/2002 | Cobb et al. |
| 2002/0174295 A1 | 11/2002 | Ulrich et al. |
| 2002/0174296 A1 | 11/2002 | Ulrich et al. |
| 2002/0178162 A1 | 11/2002 | Ulrich et al. |
| 2002/0191311 A1 | 12/2002 | Ulrich et al. |
| 2002/0194523 A1 | 12/2002 | Ulrich et al. |
| 2002/0194526 A1 | 12/2002 | Ulrich et al. |
| 2002/0198864 A1 | 12/2002 | Ostermann et al. |
| 2003/0005159 A1 | 1/2003 | Kumhyr |
| 2003/0009511 A1 | 1/2003 | Giotta et al. |
| 2003/0014391 A1 | 1/2003 | Evans et al. |
| 2003/0033308 A1 | 2/2003 | Patel et al. |
| 2003/0061491 A1 | 3/2003 | Jaskiewicz et al. |
| 2003/0109253 A1 | 6/2003 | Fenton et al. |
| 2003/0120863 A1 | 6/2003 | Lee et al. |
| 2003/0125852 A1 | 7/2003 | Schade et al. |
| 2003/0126522 A1 | 7/2003 | English et al. |
| 2003/0131860 A1 | 7/2003 | Ashcraft et al. |
| 2003/0135514 A1 | 7/2003 | Patel et al. |
| 2003/0149750 A1 | 8/2003 | Franzenburg |
| 2003/0158861 A1 | 8/2003 | Sawdon et al. |
| 2003/0158873 A1 | 8/2003 | Sawdon et al. |
| 2003/0161302 A1 | 8/2003 | Zimmermann et al. |
| 2003/0163726 A1 | 8/2003 | Kidd |
| 2003/0172149 A1 | 9/2003 | Edsall et al. |
| 2003/0177308 A1 | 9/2003 | Lewalski-Brechter |
| 2003/0182312 A1 | 9/2003 | Chen et al. |
| 2003/0182325 A1 | 9/2003 | Manley et al. |
| 2003/0233385 A1 | 12/2003 | Srinivasa et al. |
| 2003/0237019 A1 | 12/2003 | Kleiman et al. |
| 2004/0003053 A1 | 1/2004 | Williams |

(56) References Cited

U.S. PATENT DOCUMENTS

| | | |
|---|---|---|
| 2004/0024731 A1 | 2/2004 | Cabrera et al. |
| 2004/0024963 A1 | 2/2004 | Talagala et al. |
| 2004/0078680 A1 | 4/2004 | Hu et al. |
| 2004/0078812 A1 | 4/2004 | Calvert |
| 2004/0117802 A1 | 6/2004 | Green |
| 2004/0133670 A1 | 7/2004 | Kaminsky et al. |
| 2004/0143647 A1 | 7/2004 | Cherkasova |
| 2004/0153479 A1 | 8/2004 | Mikesell et al. |
| 2004/0158549 A1 | 8/2004 | Matena et al. |
| 2004/0174798 A1 | 9/2004 | Riguidel et al. |
| 2004/0189682 A1 | 9/2004 | Troyansky et al. |
| 2004/0199734 A1 | 10/2004 | Rajamani et al. |
| 2004/0199812 A1 | 10/2004 | Earl et al. |
| 2004/0205141 A1 | 10/2004 | Goland |
| 2004/0230748 A1 | 11/2004 | Ohba |
| 2004/0240444 A1 | 12/2004 | Matthews et al. |
| 2004/0260673 A1 | 12/2004 | Hitz et al. |
| 2004/0267747 A1 | 12/2004 | Choi et al. |
| 2005/0010592 A1 | 1/2005 | Guthrie |
| 2005/0033778 A1 | 2/2005 | Price |
| 2005/0044197 A1 | 2/2005 | Lai |
| 2005/0066095 A1 | 3/2005 | Mullick et al. |
| 2005/0105524 A1* | 5/2005 | Stevens et al. ............. 370/389 |
| 2005/0114402 A1 | 5/2005 | Guthrie |
| 2005/0114609 A1 | 5/2005 | Shorb |
| 2005/0125456 A1 | 6/2005 | Hara et al. |
| 2005/0131860 A1 | 6/2005 | Livshits |
| 2005/0131990 A1 | 6/2005 | Jewell |
| 2005/0138195 A1 | 6/2005 | Bono |
| 2005/0138252 A1 | 6/2005 | Gwilt |
| 2005/0171960 A1 | 8/2005 | Lomet |
| 2005/0171962 A1 | 8/2005 | Martin et al. |
| 2005/0187889 A1 | 8/2005 | Yasoshima |
| 2005/0188052 A1 | 8/2005 | Ewanchuk et al. |
| 2005/0192993 A1 | 9/2005 | Messinger |
| 2005/0193389 A1 | 9/2005 | Murphy et al. |
| 2005/0289169 A1 | 12/2005 | Adya et al. |
| 2005/0289188 A1 | 12/2005 | Nettleton et al. |
| 2006/0004760 A1 | 1/2006 | Clift et al. |
| 2006/0041894 A1 | 2/2006 | Cheng |
| 2006/0047713 A1 | 3/2006 | Gornshtein et al. |
| 2006/0047925 A1 | 3/2006 | Perry |
| 2006/0053263 A1 | 3/2006 | Prahlad et al. |
| 2006/0059467 A1 | 3/2006 | Wong |
| 2006/0074922 A1 | 4/2006 | Nishimura |
| 2006/0083177 A1 | 4/2006 | Iyer et al. |
| 2006/0095438 A1 | 5/2006 | Fachan et al. |
| 2006/0101062 A1 | 5/2006 | Godman et al. |
| 2006/0123211 A1 | 6/2006 | Derk et al. |
| 2006/0129584 A1 | 6/2006 | Hoang et al. |
| 2006/0129631 A1 | 6/2006 | Na et al. |
| 2006/0129983 A1 | 6/2006 | Feng |
| 2006/0155831 A1 | 7/2006 | Chandrasekaran |
| 2006/0161920 A1 | 7/2006 | An et al. |
| 2006/0206536 A1 | 9/2006 | Sawdon et al. |
| 2006/0230411 A1 | 10/2006 | Richter et al. |
| 2006/0277432 A1 | 12/2006 | Patel |
| 2006/0288161 A1 | 12/2006 | Cavallo |
| 2006/0294589 A1 | 12/2006 | Achanta et al. |
| 2007/0038887 A1 | 2/2007 | Witte et al. |
| 2007/0091790 A1 | 4/2007 | Passey et al. |
| 2007/0094269 A1 | 4/2007 | Mikesell et al. |
| 2007/0094277 A1 | 4/2007 | Fachan et al. |
| 2007/0094310 A1 | 4/2007 | Passey et al. |
| 2007/0094431 A1 | 4/2007 | Fachan |
| 2007/0094449 A1 | 4/2007 | Allison et al. |
| 2007/0094452 A1 | 4/2007 | Fachan |
| 2007/0124337 A1 | 5/2007 | Flam |
| 2007/0168351 A1 | 7/2007 | Fachan |
| 2007/0171919 A1 | 7/2007 | Godman et al. |
| 2007/0192254 A1 | 8/2007 | Hinkle |
| 2007/0195810 A1 | 8/2007 | Fachan |
| 2007/0198518 A1 | 8/2007 | Luchangco et al. |
| 2007/0233684 A1 | 10/2007 | Verma et al. |
| 2007/0233710 A1 | 10/2007 | Passey et al. |
| 2007/0244877 A1 | 10/2007 | Kempka |
| 2007/0255765 A1 | 11/2007 | Robinson |
| 2007/0255921 A1 | 11/2007 | Gole et al. |
| 2007/0288490 A1 | 12/2007 | Longshaw |
| 2008/0005145 A1 | 1/2008 | Worrall |
| 2008/0010507 A1 | 1/2008 | Vingralek |
| 2008/0021907 A1 | 1/2008 | Patel et al. |
| 2008/0031238 A1 | 2/2008 | Harmelin et al. |
| 2008/0034004 A1 | 2/2008 | Cisler et al. |
| 2008/0044016 A1 | 2/2008 | Henzinger |
| 2008/0046432 A1 | 2/2008 | Anderson et al. |
| 2008/0046443 A1 | 2/2008 | Fachan et al. |
| 2008/0046444 A1 | 2/2008 | Fachan et al. |
| 2008/0046445 A1 | 2/2008 | Passey et al. |
| 2008/0046475 A1 | 2/2008 | Anderson et al. |
| 2008/0046476 A1 | 2/2008 | Anderson et al. |
| 2008/0046667 A1 | 2/2008 | Fachan et al. |
| 2008/0059541 A1 | 3/2008 | Fachan et al. |
| 2008/0059734 A1 | 3/2008 | Mizuno |
| 2008/0126365 A1 | 5/2008 | Fachan et al. |
| 2008/0151724 A1 | 6/2008 | Anderson et al. |
| 2008/0154978 A1 | 6/2008 | Lemar et al. |
| 2008/0155191 A1 | 6/2008 | Anderson et al. |
| 2008/0168209 A1 | 7/2008 | Davison |
| 2008/0168304 A1 | 7/2008 | Flynn et al. |
| 2008/0168458 A1 | 7/2008 | Fachan et al. |
| 2008/0243773 A1 | 10/2008 | Patel et al. |
| 2008/0256103 A1 | 10/2008 | Fachan et al. |
| 2008/0256537 A1 | 10/2008 | Fachan et al. |
| 2008/0256545 A1 | 10/2008 | Fachan et al. |
| 2008/0263549 A1 | 10/2008 | Walker |
| 2008/0294611 A1 | 11/2008 | Anglin et al. |
| 2009/0055399 A1 | 2/2009 | Lu et al. |
| 2009/0055604 A1 | 2/2009 | Lemar et al. |
| 2009/0055607 A1 | 2/2009 | Schack et al. |
| 2009/0125563 A1 | 5/2009 | Wong et al. |
| 2009/0210880 A1 | 8/2009 | Fachan et al. |
| 2009/0248756 A1 | 10/2009 | Akidau et al. |
| 2009/0248765 A1 | 10/2009 | Akidau et al. |
| 2009/0248975 A1 | 10/2009 | Daud et al. |
| 2009/0249013 A1 | 10/2009 | Daud et al. |
| 2009/0252066 A1 | 10/2009 | Passey et al. |
| 2009/0327218 A1 | 12/2009 | Passey et al. |
| 2010/0122057 A1 | 5/2010 | Strumpen et al. |
| 2010/0161556 A1 | 6/2010 | Anderson et al. |
| 2010/0161557 A1 | 6/2010 | Anderson et al. |
| 2010/0185592 A1 | 7/2010 | Kryger |
| 2010/0223235 A1 | 9/2010 | Fachan |
| 2010/0235413 A1 | 9/2010 | Patel |
| 2010/0241632 A1 | 9/2010 | Lemar et al. |
| 2010/0306786 A1 | 12/2010 | Passey |
| 2011/0016353 A1 | 1/2011 | Mikesell et al. |
| 2011/0022790 A1 | 1/2011 | Fachan |
| 2011/0035412 A1 | 2/2011 | Fachan |
| 2011/0087635 A1 | 4/2011 | Fachan |
| 2011/0113211 A1 | 5/2011 | Fachan et al. |
| 2011/0119234 A1 | 5/2011 | Schack et al. |
| 2011/0145195 A1 | 6/2011 | Passey et al. |
| 2011/0153569 A1 | 6/2011 | Fachan et al. |

FOREIGN PATENT DOCUMENTS

| | | |
|---|---|---|
| EP | 1563411 | 8/2005 |
| EP | 2284735 | 2/2011 |
| EP | 2299375 | 3/2011 |
| JP | 04096841 | 3/1992 |
| JP | 2000-047831 | 2/2000 |
| JP | 2000-099282 | 4/2000 |
| JP | 2002-091804 | 3/2002 |
| JP | 2006-506741 | 6/2004 |
| JP | 4464279 | 5/2010 |
| JP | 4504677 | 7/2010 |
| JP | 5096441 | 9/2012 |
| WO | WO 94/29796 | 12/1994 |
| WO | WO 00/57315 | 9/2000 |
| WO | WO 01/14991 | 3/2001 |
| WO | WO 01/33829 | 5/2001 |
| WO | WO 02/061737 | 8/2002 |
| WO | WO 03/012699 | 2/2003 |

(56) References Cited

FOREIGN PATENT DOCUMENTS

| WO | WO 2004/046971 | 6/2004 |
|---|---|---|
| WO | WO 2008/021527 | 2/2008 |
| WO | WO 2008/021528 | 2/2008 |
| WO | WO 2008/127947 | 10/2008 |

OTHER PUBLICATIONS

Apr. 20, 2004 Int'l Search report PCT/US03/36699, 10 pages.
Aug. 6, 2004 Int'l Search report PCT/US03/33704, 11 pages.
May 21, 2007 European Search Report EP 02756944.1-2201, 8 pages.
Oct. 8, 2008 European Supplemental Search Report EP 02 75 6944, 6 pages.
Jan. 23, 2009 Examination Report EP 02 75 6944, 5 pages.
Feb. 22, 2008 Int'l Search report PCT/US07/018326, 20 pages.
May 8, 2008 Int'l Search report PCT/US07/018324, 13 pages.
May 18, 2009 Int'l Search report PCT/US08/059798, 18 pages.
Oct. 22, 2009 Int'l Preliminary Report on Patentability PCT/US08/059798, 10 pages.
Philip A. Bernstein, Vassos Hadzilacos, and Nathan Goodman, Concurrency Control and Recovery in Database Systems, Addison-Wesley, 1987, pp. iii-270.
Kenneth P. Birman, Building Secure and Reliable Network Applications, Manning, 1996, pp. xvi-300.
Kenneth P. Birman, Building Secure and Reliable Network Applications, Manning, 1996, pp. 301-591.
Birk, Y., Deterministic load-balancing schemes for disk-based video-on-demand storage servers, Mass Storage Systems 1995; Storage—At the Forefront of Information Infrastructures', Proceedings of the Fourteenth IEEE Symposium on Monterey, CA, Sep. 11-14, 1995, pp. 17-25.
Coulouris et al., Distributed Systems Concepts and Design; Addison-Wesley, Second Edition, 1994, pp. 353-371 and 377-405.
Jim Gray and Andreas Reuter, Transaction Processing: Concepts and Techniques, Morgan Kaufmann, 1993, pp. v-290.
Jim Gray and Andreas Reuter, Transaction Processing: Concepts and Techniques, Morgan Kaufmann, 1993, pp. 291-628.
Jim Gray and Andreas Reuter, Transaction Processing: Concepts and Techniques, Morgan Kaufmann, 1993, pp. 630-1070.
Kumar, Akhil, "An analysis of borrowing policies for escrow transactions in a replicated data environment", Institute of Electrical and Electronics Engineers; Proceedings of the International Conference on Data Engineering, Los Angeles, Feb. 5-9, 1990; Los Alamitos, IEEE, Comp. Soc. Press, US. vol. Conf. 6, Feb. 5, 1990, pp. 446-454, XP010018185 ISBN:978-0-8186-2025-6 p. 446, left-hand column, line 1—p. 447, last line.
Nancy A. Lynch, Distributed Algorithms, Morgan Kaufmann, 1996, pp. 1-395.
Nancy A. Lynch, Distributed Algorithms, Morgan Kaufmann, 1996 pp. 397-872.
Sape Mullender, editor, Distributed Systems (2nd Ed.), ACM Press/Addison-Wesley Publishing Co., New York, NY, USA, 1993, pp. v-315.
Sape Mullender, editor, Distributed Systems (2nd Ed.), ACM Press/Addison-Wesley Publishing Co., New York, NY, USA, 1993, pp. 316-595.
Gibson, Garth A. et al., The Scotch Parallel Storage System, IEEE, 1995, pp. 403-410.
Gerhard Weikum, et al., Transactional Information Systems: Theory, Algorithms, and the Practice of Concurrency Control and Recovery, Morgan Kaufmann, 2002, pp. ix-xxv and 2-435.
Gerhard Weikum, et al., Transactional Information Systems: Theory, Algorithms, and the Practice of Concurrency Control and Recovery, Morgan Kaufmann, 2002, pp. 436-853.
Sanjay Ghemawat et al., The Google File System, Symposium on Operating Systems Principles, Oct. 19-22, 2003, 15 pages, Bolton Landing, NY.
Pei Cao et al., The TickerTAIP parallel RAID architecture, 1993, 12 pages, Princeton, NJ.
Pei Cao et al., The TickerTAIP parallel RAID architecture, ACM Transactions on Computer Systems, vol. 12, No. 3, Aug. 1994, 34 pages, Palto Alto, California.
Duzett, Bob et al., An Overview of the nCube 3 Supercomputer, IEEE, Jul. 1992, pp. 458-464.
Hartman, John Henry, The Zebra Striped Network File System, (Sc.B. (Brown University) 1987, pp. 1-148.
Keidar, et al.: Increasing the Resilience of Distributed and Replicated Database Systems (1998) pp. 1-25.
Long, Darrell D.E., et al., Swift/RAID: A Distributed RAID System, Computing Systems, vol. 7, No. 3 Summer 1994, pp. 333-359.
Stallings, William, Operating Systems, Prentice Hall, Fourth Edition; 2001, pp. 197-253 and 265-293.
Michael Stonebraker et al., Distributed Raid: A New Multiple Copy Algorithm, Proc. Sixth Int. Conf. Data Eng., IEEE Service Center, Piscataway, NJ (IEEE cat No. 90CH2840-7), pp. 430-437, Feb. 5, 1990.
United States Court of Appeals, Federal Circuit, Seachange International, Inc. vs. nCUBE, Corp., Oct. 26, 2004, 28 pages.
United States Court of Appeals, Federal Circuit, Seachange International, Inc. vs. C-Corp, Inc., Jun. 29, 2005, 22 pages.
United States District Court, Delaware, Seachange International, Inc. vs. nCUBE, Corp., Apr. 7, 2004, 13 pages.
United States District Court, Delaware, Seachange International, Inc. vs. nCUBE, Corp., Aug. 29, 2000, 12 pages.
Steven M. Bauer, Letter to Steve Goldman, Jul. 31, 2006 (including the first page of the patents), 8 pages.
Arthur S. Rose, Letter to Steven M. Bauer, Aug. 7, 2006, 2 pages.
Steven M. Bauer, Letter to Arthur S. Rose, Sep. 25, 2006, 2 pages.
Steven M. Bauer, Letter to Arthur S. Rose, Oct. 31, 2006, 1 page.
Arthur S. Rose, Letter to Steven M. Bauer, Nov. 9, 2006, 2 pages.
Steven M. Bauer, Letter to Arthur S. Rose, Feb. 6, 2007, 2 pages.
Arthur S. Rose, Letter to Steven M. Bauer, Feb. 23, 2007, 1 page.
Steven M. Bauer, Letter to Arthur S. Rose, Jun. 7, 2007 (including claim chart), 28 pages.
Arthur S. Rose, Letter to Steven M. Bauer, Jun. 22, 2007, 1 page.
Todd A. Gerety, Letter to Arthur S. Rose, Jun. 26, 2007 (exhibits listed separately below), 1 page.
Isilon Systems, "Isilon IQ Platform Overview", 4 pages, 2007 (Exhibit A).
Isilon Systems, "Uncompromising Reliability through Clustered Storage", Sep. 2006, 10 pages (Exhibit B).
Byteandswitch, "Discovery Chooses Isilon," Apr. 23, 2007, 1 page (Exhibit C).
Taneja Group Technology Analysts, "The Power of InfiniBand and Clustered Storage", Dec. 2005, 8 pages (Exhibit E).
Arthur S. Rose, Letter to Steven M. Bauer, Aug. 31, 2007, 4 pages.
Ramez Elmasri, Fundamentals of Database Systems 3rd ed, Sep. 30, 1999, Addison-Wesley, pp. 155-156, 169-173, 178-179, 181-182, 381, 771.
MCSA/MSCE/MCDBA Self Paced Training Kit: MS SQL Server 2000 System Administration, May 14, 2003, Microsoft Press, Second Edition, 12 pages.
Supp EPO Search Report, App. No. EP 03 78 3599; dated Apr. 29, 2008, 2 pages.
Levy E., Ed.—Institute of Electrical and Electronics Engineers: "Incremental restart (database management)" Proc. Int. Conf. Data Eng., Kobe, JP, Apr. 8-12, 1991; IEEE Comp. Soc. Press, U.S., vol. Conf. 7, Apr. 8, 1991, pp. 640-648.
Haerder T et al: "Principles of Transaction-Oriented Database Recovery" ACM Computing Surveys, ACM, New York, NY, US, vol. 15, No. 4, Dec. 1, 1983, pp. 287-317.
Gray J et al: "Transaction processing: concepts and techniques (excerpt), Passage" Transaction Processing: Concepts and Techniques, Jan. 1, 1993, pp. 373-445.
Garcia-Molina H et al: "Database System Implementation, passage" Database System Implementation, Jan. 1, 2000, pp. I-V, 423-509.
Wedde H. F., et al.: "A universal framework for managing metadata in the distributed Dragon Slayer System", Proceedings of the Euromicro Conference. Euromicro. Informatics: Inventing the Future, Proceedings of Euromicro Workshop on Multimedia and Telecommunications, vol. 2, Sep. 5, 2000, pp. 96, 98, 100, 143, 141.

(56) References Cited

OTHER PUBLICATIONS

Tanenbaum, Andrew S., MINIX Operating System, Japan, Apr. 21, 1989, 1st Edition, pp. 328, 505; Also attached is what Applicant believes is the English language version: Tanenbaum, Andrew S., Operating Systems: Design and Implementation, Prentice-Hall, 1987, pp. 279, 347-348.

Yamashita, Hirofumi, et al., "Development of RAID Filesystem VAFS/HR," The Special Interest Group Notes of IPSJ, Japan, Information Processing Society of Japan, Sep. 16, 1994, vol. 94, No. 80, p. 9-16.

Lougher P. et al., "Scalable storage servers for digital audio and video," International Conference on Storage and Recording Systems, 1994, Keele, UK, Jan. 1, 1994, pp. 140-143.

Reddy, P. Krishna et al., Reducing the blocking in two phase commit with backup sites Apr. 15, 2003, Elsevier, pp. 39-47.

IOS Commands, Feb. 6, 2005, Pantz.org, [online], <web.archive.org/web/20050206184604/http://pantz.org/os/ios/ioscommands.shtml>, 12 pages.

IP Forwarding with Cisco Routers Lab Exercises, Jun. 15, 1999 [online], <ws.edu.isoc.org/data1999/1481713642400af6a2de65a/ip_fwd_cisco_config.ppt>, 11 pages.

Hisayuki Aoki, Parallel Filesystem MFS, IPSJ SIG Technical Reports, Japan, Information Processing Society of Japan, Aug. 26, 1996, vol. 96, No. 79, pp. 31 to 36 (stamped Citation 1 / English Translation attached, 23 pages).

Yoshitake Shinkai, Cluster File System: HAMFS, Fujitsu, Japan, Fujitsu Limited, Jul. 9, 1999, vol. 50, No. 4, pp. 210 to 214 (stamped Citation 2 / English Translation attached, 16 pages).

Duchamp, Dan: "Analysis of Transaction Management Performance", ACM Symposium on Operating Systems Principles, Dec. 1989, pp. 177-190.

Silaghi, Raul et al.: "Porting OMTTs to CORBA", Lecture Notes in Computer Science, vol. 2888/2003, Nov. 2003, pp. 1521-1542.

Dorai et al.:, "Transport Threads: Resource Sharing in SMT Processor for High Single-Thread Performance", proceedings of the 2002 International Conference on Parallel Architectures and Complication Techniques, Sep. 2002, 12 pages.

Peterson, Zachary Nathaniel Joseph, "Data Placement for Copy-On-Write Using Virtual Contiguity," Master of Science in Computer Science Thesis, University of California, Santa Cruz, Sep. 2002, 67 pages.

Jan. 2, 2012 Extended European Search Report EP 2299375, 6 pages.

HP IT Resource Center, Slow Internal Disk, Feb. 22, 2005, in 7 pages.

Shen, W. et al., "Distributed and Dynamic Task Reallocation in Robot Organizations," Proceedings of the 2002 IEEE Intn'l Conf. on Robotics & Automation, May 2002, pp. 1019-1024.

Dec. 23, 2008 Non-Final Rejection in U.S. Appl. No. 11/357,740, filed Feb. 17, 2006.

Apr. 22, 2009 Response to Dec. 23, 2008 Non-Final Rejection in U.S. Appl. No. 11/357,740, filed Feb. 17, 2006.

Jul. 10, 2009 Non-Final Rejection in U.S. Appl. No. 11/357,740, filed Feb. 17, 2006.

Oct. 13, 2009 Final Amendment to Jul. 10, 2009 Non-Final Rejection in U.S. Appl. No. 11/357,740, filed Feb. 17, 2008.

Jan. 25, 2010 Office Action in U.S. Appl. No. 11/357,740, filed Feb. 17, 2006.

Sep. 2, 2010 Notice of Allowance in U.S. Appl. No. 11/357,740, filed Feb. 17, 2006.

Nov. 17, 2010 Issue Notification in U.S. Appl. No. 11/357,740, filed Feb. 17, 2006.

HP, Slow Internal Disk, Feb. 22, 2005, p. 2 and 6, in 7 pages.

Shen, et al., Distributed and Dynamic Task Reallocation in Robot Organizations; IEEE 2002, pp. 1019-1024.

* cited by examiner

SYSTEMS AND METHODS FOR PROVIDING A QUIESCING PROTOCOL

REFERENCE TO RELATED APPLICATIONS

This application is a continuation of and claims benefit of priority under 35 U.S.C. §120 to U.S. patent application Ser. No. 11/357,740, filed Feb. 17, 2006, titled "SYSTEMS AND METHODS FOR PROVIDING A QUIESCING PROTOCOL", which is hereby incorporated by reference herein in its entirety.

LIMITED COPYRIGHT AUTHORIZATION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

This invention relates to systems and methods for providing a quiescing protocol that allows a set of nodes to continue processing until they reach a consistent state.

BACKGROUND

The increase in processing power of computer systems has ushered in a new era in which information is accessed on a constant basis. One response has been to distribute processing requests across multiple nodes or devices. A distributed architecture allows for more flexible configurations with respect to factors such as speed, bandwidth management, and other performance and reliability parameters.

The distributed architecture also allows for a more fault-tolerant system. Accordingly, if one of the nodes is not available, then the other nodes may continue to process requests. Additional problems may occur, however, when one of the failed nodes comes back online and tries to reintegrate into the system.

Because of the foregoing challenges and limitations, there is an ongoing need to improve the manner in which nodes of a distributed architecture process requests.

SUMMARY OF THE INVENTION

The systems and methods described herein provide a quiescing protocol.

In one embodiment, a distributed system configured to process messages within the distributed system is provided. The distributed system may include a plurality of distributed nodes configured to permit communication among the plurality of nodes and to process messages; at least one of the plurality of nodes acting as a coordinator, the coordinator configured to initiate a quiescing protocol and to determine whether relevant messages have been processed by the plurality of the distributed nodes.

In an additional embodiment, a method of quiescing a set of messages processed within the system is provided. The method may include sending start messages to a plurality of nodes indicating that a quiescing protocol is to begin; receiving checkpoint messages from the plurality of nodes indicating that the plurality of nodes have received their probe response messages; sending continue messages to the plurality of nodes requesting received message information from the plurality of nodes; receiving received message information from the plurality of nodes; and determining that the received message information indicates that the plurality of nodes have not received any new messages.

In a further embodiment, a system for quiescing a set of messages processed within the distributed system is provided. The system may include means for sending start messages to a plurality of nodes indicating that a quiescing protocol is to begin; means for receiving checkpoint messages from the plurality of nodes indicating that the plurality of nodes have received their probe response messages; means for sending continue messages to the plurality of nodes requesting received message information from the plurality of nodes; means for receiving received message information from the plurality of nodes; and means for determining that the received message information indicates that the plurality of nodes have not received any new messages.

In an additional embodiment, a method of quiescing a distributed system is provided. The method may include setting a counter and counting messages that have been received; ensuring that all messages previously sent have been processed by their destination; performing a checkpoint; and performing a second checkpoint using the value of the counter.

In a further embodiment, a method of quiescing a distributed system is provided. The method may include receiving a start message from a coordinator indicating that a quiescing protocol is to begin; suspending new messages; setting a received message information to indicate that there are no messages received; receiving messages from the plurality of nodes; updating the received message information to indicate that a message has been received; sending probe messages to the plurality of nodes; receiving probe response messages from the plurality of nodes; receiving probe messages from the plurality of nodes; for each probe message received from the plurality of nodes, sending corresponding probe response messages to the plurality of nodes; sending a checkpoint message to the coordinator indicating that the probe response messages have been received from the plurality of nodes; receiving a continue message from the coordinator requesting the received message information; sending the received message information to the coordinator; and receiving a done message from the coordinator.

For purposes of summarizing this invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Figure 1A:
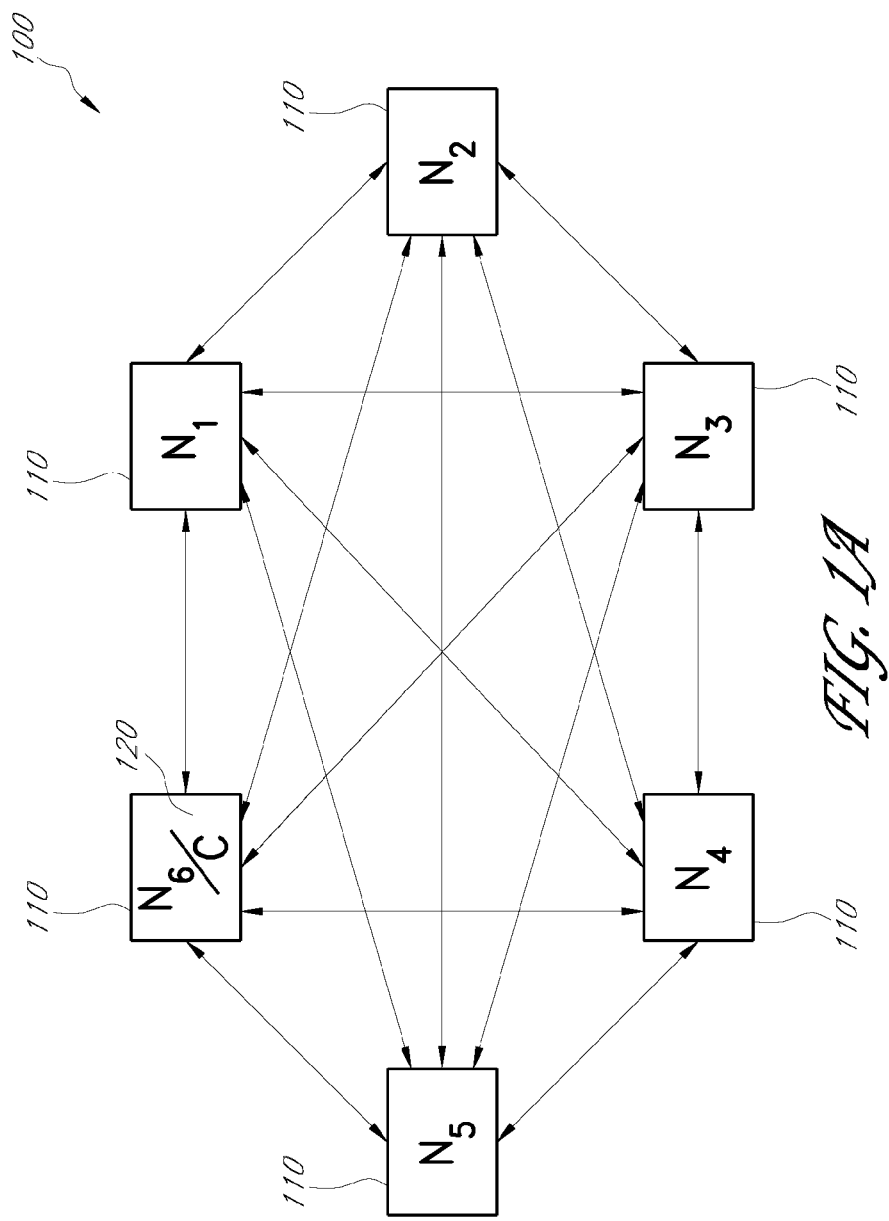
FIGS. 1A and 1B illustrate embodiments of high-level block diagrams of one embodiment of nodes in a system.

These and other features will now be described with reference to the drawings summarized above. The drawings and the associated descriptions are provided to illustrate embodiments of the invention and not to limit the scope of the invention. Throughout the drawings, reference numbers may be re-used to indicate correspondence between referenced elements. In addition, the first digit of each reference number generally indicates the figure in which the element first appears.

DETAILED DESCRIPTION OF PREFERRED EMBODIMENTS

Systems and methods which represent one embodiment and example application of the invention will now be described with reference to the drawings. Variations to the systems and methods which represent other embodiments will also be described.

For purposes of illustration, some embodiments will be described in the context of a distributed file system. The present invention is not limited by the type of environment in which the systems and methods are used, however, and the systems and methods may be used in other environments, such as, for example, the Internet, the World Wide Web, a private network for a hospital, a broadcast network for a government agency, an internal network of a corporate enterprise, an intranet, a local area network, a wide area network, and so forth. Some of the figures and descriptions, however, relate to an embodiment of the invention wherein the environment is that of a distributed file system. It is also recognized that in other embodiments, the systems and methods may be implemented as a single module and/or implemented in conjunction with a variety of other modules and the like. Moreover, the specific implementations described herein are set forth in order to illustrate, and not to limit, the invention. The scope of the invention is defined by the appended claims.

I. OVERVIEW

Distributed architectures require the cooperation of many different nodes. Nodes are constantly communicating with each other in order, for example, to share common resources and to divide responsibilities. Nodes send messages to other nodes, and these messages may trigger the creation of other messages, and so forth. There may be many examples when it is desirable to stall the state of the distributed architecture in order to perform some system operation. Because messages sent to other nodes may trigger a long line of succeeding messages, it is difficult to know when a system has reached a consistent state and, thus, has been successfully quiesced.

Accordingly, there is a need for a quiescing protocol for a distributed network system in order to perform maintenance to or to monitor the system. For example, it may be desirable to quiesce a distributed system in order to take a global snapshot of data structures and/or other system information, which may be used for diagnosing or debugging purposes. Alternatively, it may be desirable to quiesce a distributed system in order to change the responsibilities of different nodes. For example, if one node is removed from or loses communication with the system, there is a need to reassign the responsibilities of the lost node to the remaining nodes. In order to do this effectively and efficiently, it is desirable to quiesce the system.

Some methods for quiescing a distributed architecture have significant disadvantages. For example, a distributed architecture may be quiesced by suspending the creation of new messages for a predetermined amount of time. There are several disadvantages, however, with this method. If all of the messages have not terminated within the predetermined time period, then the state of the distributed system will be destroyed during the quiescing time period. To avoid this problem, a time period may be chosen that, for instance, lasts as long as the time it takes to process the longest message (and, perhaps, that message's children messages). Thus, the system assumes that during the time period all of the messages will have finished being processed. However, even if the time period allows all of the messages to terminate, it is likely that in some cases, all of the messages will have terminated before the end of the predetermined time period, resulting in unnecessary delay. Hence, there is a need for a quiescing system that both ensures that the messages in a distributed architecture have all been processed during the quiescing protocol and that terminates without delay when the messages have finished processing.

The systems and methods of the present invention provide a quiescing protocol. In one embodiment, nodes of a system utilize the protocol to complete processing until they reach a consistent state. In one embodiment, a coordinator initiates the quiescing process and the nodes communicate with each other to determine whether their messages have been processed and communicate with the coordinator to determine when all of the messages have been processed.

A. Coordinator

The coordinator is responsible for initializing the quiescing protocol, collecting information about the messages the nodes have processed, and terminating the protocol when all of the messages have been processed.

B. Participants

The participants receive messages, process messages, communicate with the participants to determine whether the messages they sent to the other participants have been processed, and communicate with the coordinator to inform the coordinator as to the status of the message processing.

C. Communication

In one embodiment, the nodes are interconnected through a bi-directional communication link where messages are received in the order they are sent. In one embodiment, the link comprises a "keep-alive" mechanism that quickly detects when nodes or other network components fail, and the nodes are notified when a link goes up or down. In one embodiment, the link comprises a TCP connection. In other embodiments, the link includes an SDP connection over Infiniband, a wireless network, a wired network, a serial connection, IP over FibreChannel, proprietary communication links, connection based datagrams or streams, and/or connection based protocols.

D. Quiescing Protocol

In one embodiment, the coordinator sends a message to all participants indicating that the quiescing protocol is to begin. Each participant prevents new messages from being created. For example, functions that try to generate new messages are suspended for the duration of the quiescing protocol. The participants then begin tracking the number of messages they receive as well as whether messages they have sent out have been processed.

To track the number of messages they receive, in one embodiment, each participant sets a counter to zero. Thereafter, each participant increments its own counter every time the participant receives a message. The participants then process the messages in the order that they are received.

To determine whether messages they have sent out have been processed, in one embodiment, the participants begin a probing cycle. Each participant sends out a probe message to every other participant as well as itself. The probe messages are received in each participant's queue. Because messages are processed in the order that they are received, once a probe message is processed, it can be assumed that all messages previously sent to that same participant and placed in the queue before the probe message have been processed. When a participant processes a probe message that it has received, it then sends a response message to the sender. Accordingly, when the probe-sending participant receives a response message, the probe-sending participant knows that all messages sent to the responding participant before the probe message was sent have been processed.

After each of the participants has sent out probe messages and received the corresponding response messages, each participant sends a checkpoint message to the coordinator.

After the coordinator receives checkpoint messages from the participants, it sends the participants messages to tell them to continue. After receiving the continue message from the coordinator, each participant sends the contents of its counter to the coordinator. After receiving responses from the participants, the coordinator decides if the subsystem is quiesced or not. If all of the counters are zero, then the subsystem is quiesced and the coordinator sends a done message to the participants. On the other hand, if any counter is non-zero, then the subsystem is not quiesced and the coordinator sends a reset message to the participants indicating that they need to reset their counters and begin the probing cycle again. By waiting until all of the participants have received their response messages and have not processed any additional messages, the coordinator knows that all of the outstanding messages have been processed, and that the system has been quiesced in a consistent state.

While the embodiments discussed above include the generation of $N^2$ probe messages and $N^2$ probe responses for a fully connected network. It is recognized that in other embodiments, other methods may be used to ensure that all of the messages sent have been handled between the time the counter is reset and the time the checkpoint message is sent to the coordinator.

For example, in one embodiment, the quiescing protocol may include the following:

(1) Reset the counter;
(2) Make sure all messages sent before the beginning of this step have been processed by their destination;
(3) Perform a checkpoint;
(4) Perform a second checkpoint, sending along the value of the counter; and
(5) Possibly go back to (1).

Moreover, the determination of whether the messages sent have been processed by their destination may be implemented using probe messages as discussed above, though it is recognized other approaches may be used, such as, for example, a token approach, a logical-time-based approach, a timestamp-based approach, and so forth. In addition, these other embodiments may be used in connection with a fully connected network as well as with other network topologies as discussed in more detail below.

The quiescing protocol may be used for a variety of systems that involve multiple nodes. For example, this protocol may be used in distributed file systems as described in U.S. patent application Ser. No. 10/007,003 entitled "Systems and Methods for Providing a Distributed File System Utilizing Metadata to Track Information About Data Stored Throughout the System," filed Nov. 9, 2001 which claims priority to Application No. 60/309,803 filed Aug. 3, 2001, U.S. patent application Ser. No. 10/281,467 entitled "Systems and Methods for Providing A Distributed File System Incorporating a Virtual Hot Spare," filed Oct. 25, 2002, and U.S. patent application Ser. No. 10/714,326 entitled "Systems And Methods For Restriping Files In A Distributed File System," filed Nov. 14, 2003, which claims priority to Application No. 60/426,464, filed Nov. 14, 2002, all of which are hereby incorporated by reference herein in their entirety.

II. EXEMPLARY QUIESCING SYSTEM

FIG. 1A illustrates one embodiment of an exemplary quiescing system that includes a cluster 100 of nodes 110, organized into a fully connected topology. A fully connected network is a network where each of the nodes in the network is connected to every other node in the network. The exemplary cluster 100 comprises six nodes 110. These nodes are, respectively, $N_1$, $N_2$, $N_3$, $N_4$, $N_5$, and $N_6$. The exemplary cluster 100 includes a node that has been designated as the coordinator 120. In the illustrated embodiment, the coordinator 120 is designated as $N_6$. The coordinator 120 is responsible for initiating the quiescing protocol. Accordingly, the coordinator 120 communicates with the nodes 110 to initiate the quiescing protocol and to determine when the quiescing protocol is complete.

Although in the illustrated embodiment the nodes are arranged in a fully connected network topology, in other embodiments of the invention, the network of nodes may be arranged in any other topology, including, but not limited to, the following topologies: ring, mesh, star, line, tree, bus topologies, and so forth. It will be appreciated by one skilled in the art that various network topologies may be used to implement different embodiments of the invention. In addition, it is recognized that the nodes may be connected directly, indirectly, or a combination of the two, and that all of the nodes may be connected using the same type of connection or one or more different types of connections. It is also recognized that in other embodiments, a different number of nodes may be included in the cluster, such as, for example, 2, 16, 83, 6883, 10,000 and so forth.

The exemplary coordinator 120 includes a coordinator process that initiates the quiescing protocol. In one embodiment, the coordinator process lies dormant until its node is designated as the coordinator 120 at which time the coordinator process becomes active. In one embodiment, all of the nodes 110 in the cluster 100 include the coordinator process such that any one of the nodes in the cluster 100 may be selected as the coordinator 120. In other embodiments, only a subset of the nodes 110 in the cluster 100 includes the coordinator process such that only the nodes in the subset may be selected as the coordinator 120.

The coordinator may be selected from the nodes 110 in the cluster 100 using a variety of techniques. In one embodiment, the coordinator may be determined by a predetermined algorithm or set of conditions. In other embodiments, the coordinator may be determined dynamically in real time based on certain parameters or may be determined at random. For example, the coordinator may be determined based on which node first recognizes a change in the cluster, such as when a node has lost its connection with the other nodes or if a new node has been added to the cluster. As another example, the coordinator may be selected based on a round robin protocol or based on the current utilization of the node's processing power.

Although in the illustrated embodiment only one node acts as the coordinator, it is recognized that embodiments may be used wherein two or more nodes act as the coordinator. In these embodiments, the coordinator may be implemented as a conceptual entity that operates in the distributed system on multiple nodes. One skilled in the art will appreciate that there are many ways to configure the system to implement a coordinator process on a cluster of nodes.

Figure 1B:
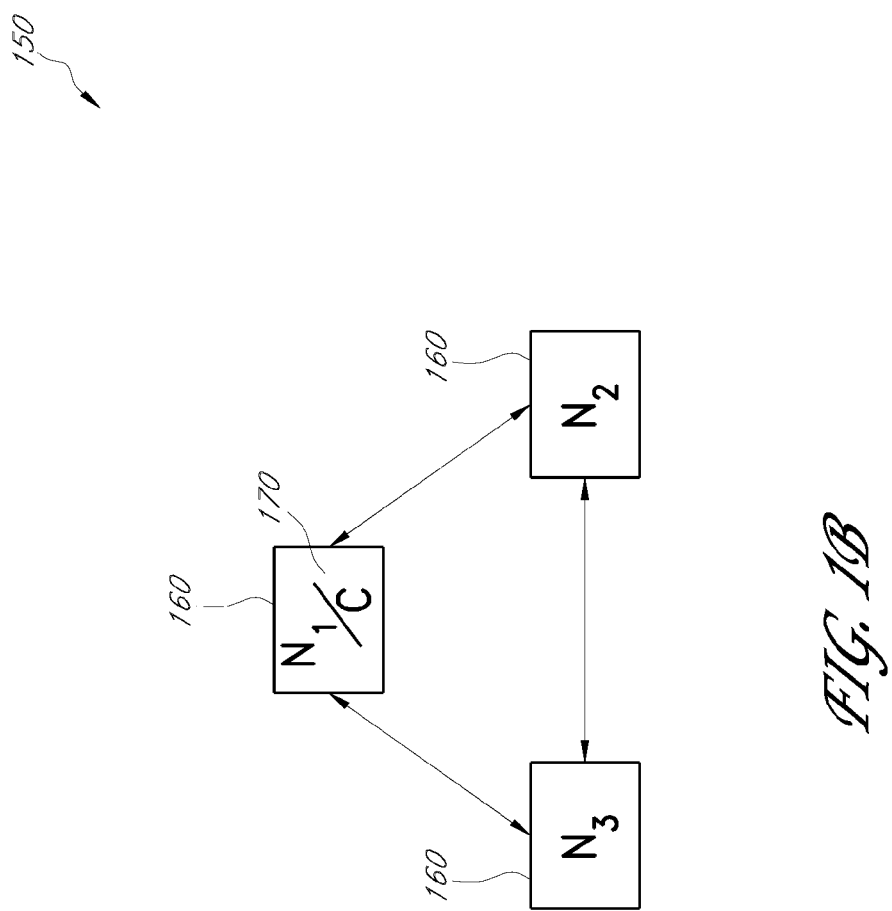

FIG. 1B illustrates another embodiment of a fully connected network that implements a quiescing protocol. The illustrated cluster 150 is a smaller cluster of nodes 160, than the cluster 100 described above with reference to FIG. 1A. In this embodiment, there are only three nodes 160. They are designated, respectively, as $N_1$, $N_2$, and $N_3$. Similar to the embodiment illustrated in FIG. 1B, the cluster 150 has designated one of the nodes 160, in this case $N_1$, as the coordinator 170. This simple three-node embodiment will form the basis for the timing chart illustrated in FIG. 2 and described below.

III. EXEMPLARY TIMING CHART

Figures 1, 2:
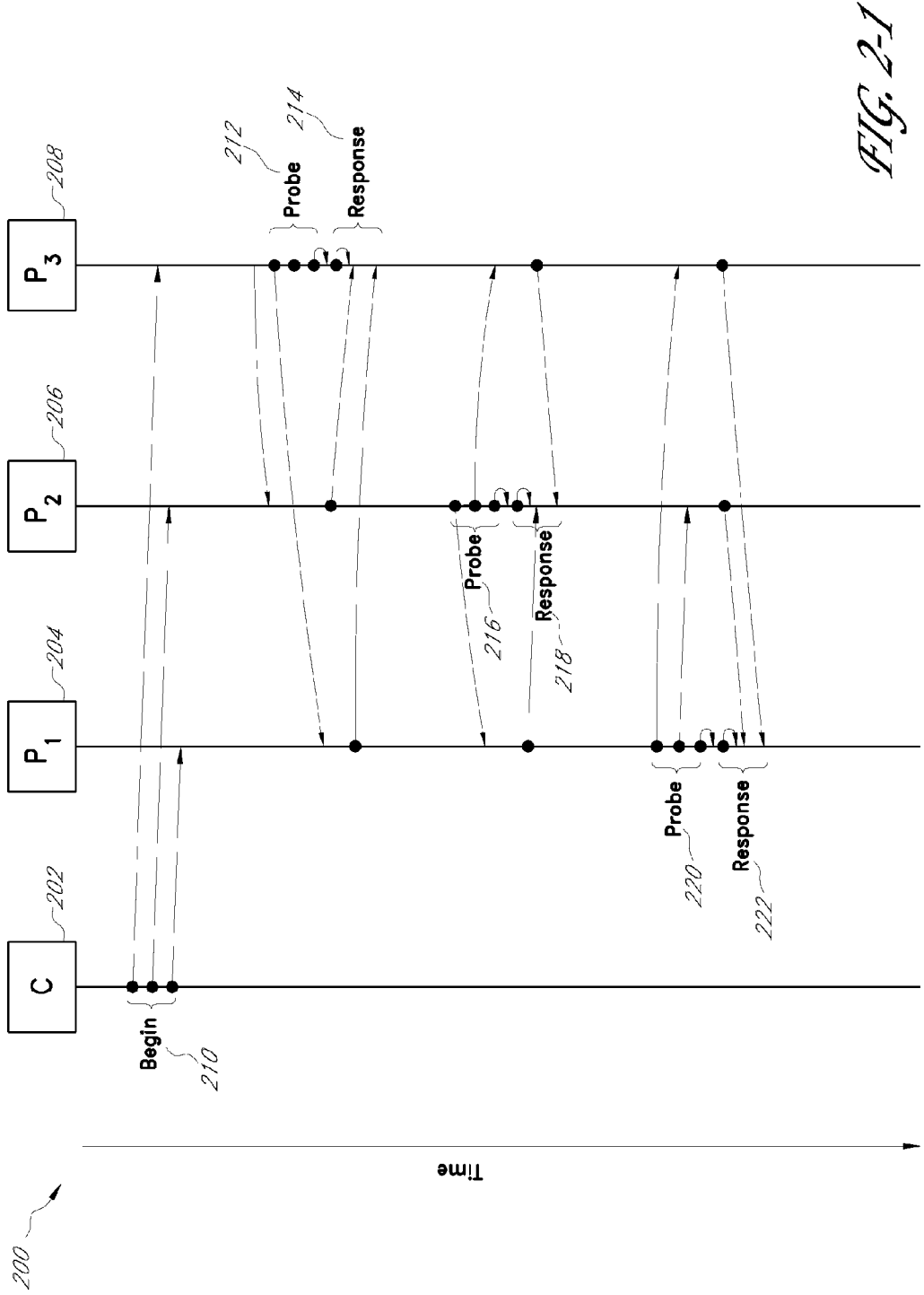
FIG. 2 illustrates an exemplary timing chart of communication among nodes using one embodiment of a quiescing protocol.
Figure 2:
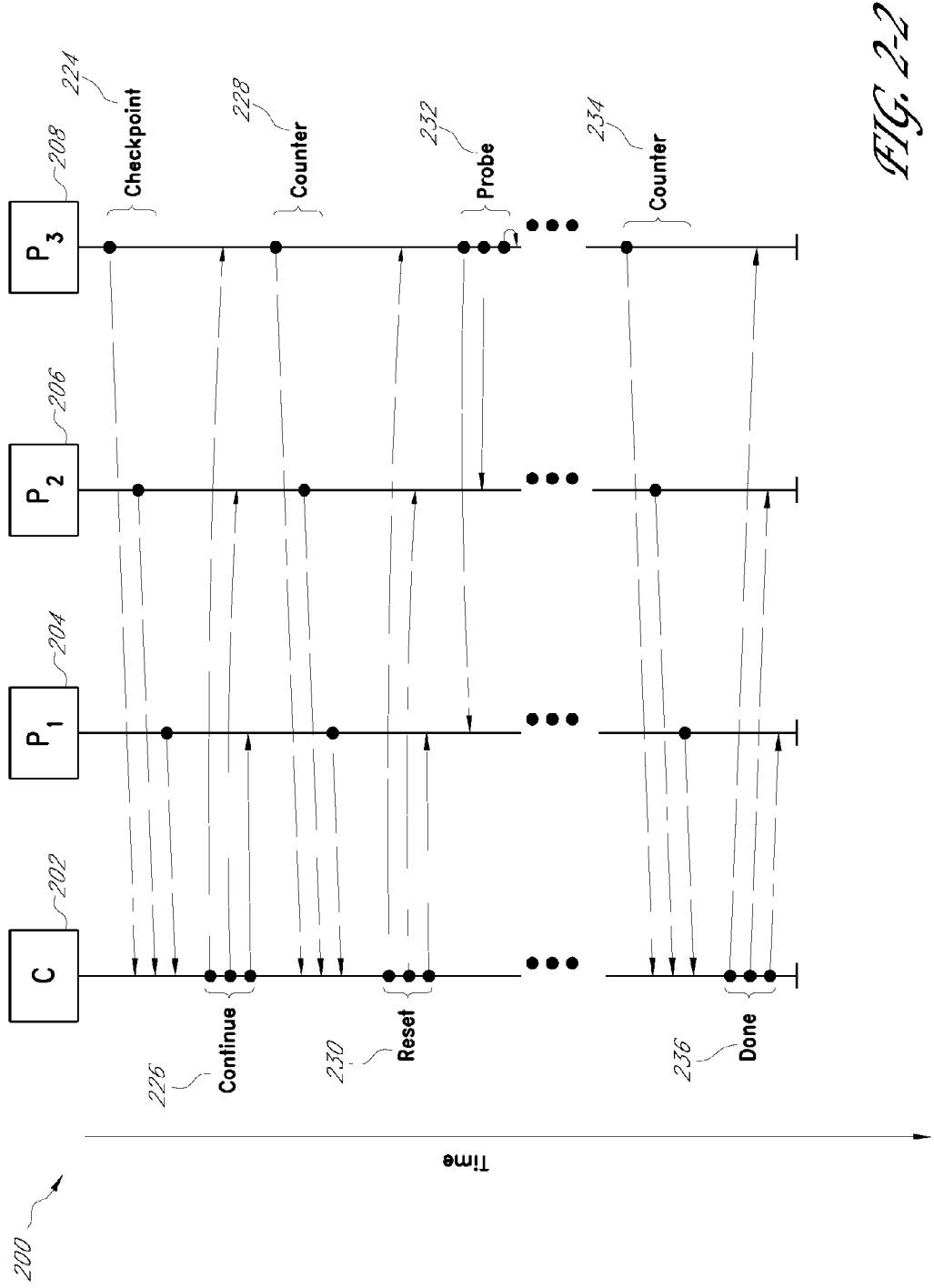

FIG. 2 illustrates a timing chart 200 of one embodiment of messages sent during a quiescing protocol. The embodiment illustrated in FIG. 2 corresponds to the cluster 150 of nodes 160 illustrated in FIG. 1B. The exemplary timing chart 200 illustrates the flow of messages among processes implementing a quiescing protocol. In the illustrated embodiment, a coordinator process 202 and three participant processes, respectively $P_1$ 204, $P_2$ 206, and $P_3$ 208, exchange messages during the quiescing protocol, where the coordinator process 202 and the participant process $P_1$ 204 are located on $N_1$, the participant process $P_2$ 206 is located on $N_2$, and the participant process $P_3$ 208 is located on $N_3$.

Although in the illustrated embodiment the participant processes reside on different nodes, in other embodiments two or more of the participant processes may reside on the same node. For example, the participant processes may be separate conceptual entities implemented as different instructions and/or memory modules of the same computing device or memory space.

The exemplary coordinator process 202 and the participant process $P_1$ 204 reside on the same node, $N_1$. Because they reside on the same node, the sending and receiving of messages between the coordinator process 202 and the participant process $P_1$ 204 may include transactions occurring entirely within the node, such as transactions over an available data bus. The participant processes $P_1$ 204, $P_2$ 206, and $P_3$ 208 reside on separate nodes. When the coordinator process and the participant process reside on different nodes, the communication between them may comprise data transmissions over a network, using the network protocol TCP/IP, for example. These processes communicate with each other via a network connection between the different nodes. One skilled in the art will appreciate that there are many ways to connect nodes and to implement communication protocols for the transmission of data between separate nodes or different processes on the same nodes.

The organization of messages sent between the coordinator and the participant processes will now be described. In some embodiments of the quiescing protocol the processes may execute certain operations that do not cause messages to be sent to other processes. For the purpose of this illustration, those operations are omitted from the exemplary timing chart. They will be described in detail below with reference to FIGS. 4, 5A, 5B, and 5C.

In the illustrated embodiment, the quiescing protocol is initiated when the coordinator process 202 sends a begin message 210 to all of the participant processes 204, 206, 208. After receiving the begin message 210, each participant process prevents new messages from being created and sets its respective message counter to zero (not shown). Each participant process then sends a probe message to every participant process, including itself. For example, $P_3$ sends probe messages 212 to $P_2$ 206 and to $P_1$ 204, and also to itself 208; $P_2$ sends probe messages 216 to $P_1$ 204, $P_3$ 208, and also to itself 206; and $P_1$ 204 sends probe messages 220 to $P_2$ 206, $P_3$ 208, and also to itself 204.

After receiving a probe message, each participant processes the messages in their respective queues until each participant reaches the probe message. The participant then processes the probe message and sends a response message to the probe-sending participant. For example, after receiving the probe message 212 from $P_3$ 208, $P_1$ 204, $P_2$ 206, and $P_3$ 208 process the messages they had received before receiving the probe messages 212, process the probe messages 212, and send response messages 214 to $P_3$ 208. Similarly, after receiving the probe messages 216 from $P_2$ 206, each participant process, including $P_2$ 206, sends a response message 218 to $P_2$ 206. Finally, after receiving the probe messages 220, each participant process, including $P_1$ 204, sends a response message 222 to $P_1$ 204. While the response messages occur in the exemplary timing chart soon after the probe messages are received, it is recognized that in some embodiments, it may take more time, depending on the number of pending messages, before the response message is sent.

While the timing chart illustrates $P_3$ first sending its probe messages and sending them in a sequential order, it is recognized that, in other embodiments, the participants may send one or more of their probe messages simultaneously, sequentially, non-sequentially, or a combination thereof. For example, $P_3$ 208 may send its probe messages to $P_1$ 204, $P_2$ 206, and itself 208 simultaneously or send them in a different order, such as, for example, to $P_1$ 204, itself 208, and then $P_2$ 206 or to $P_1$ 204 and $P_2$ 206 simultaneously and then to itself 208. Moreover, while the exemplary participant process $P_2$ 206 sends its probe messages after participant process $P_3$ 208 receives response messages from all of the other participants (and $P_1$ 204 does not send its probe message until after $P_2$ 206 receives response messages to its probes), the probe messages may be sent in a different order, such as, simultaneously, sequentially, non-sequentially, or a combination thereof. Participant processes may send probe messages at any time after receiving the begin message 210 from the coordinator process 202. For example, $P_1$ 204 and $P_2$ 206 may send their probe messages simultaneously followed by $P_3$ 208. Similarly, response messages may be sent and received simultaneously, sequentially, non-sequentially, or a combination thereof. It will be appreciated by one skilled in the art that there are many ways to configure participant processes to send probe messages and to receive response messages from participant processes. Each participant may send its probe messages independent of the activities of other participants. Similarly, each participant, after receiving a probe message, may send its response message to the probe-sending participant independent of the probing activities of other participants or the receiving activities of any participant.

After receiving response messages from every participant process, including itself, the participant processes $P_1$ 204, $P_2$ 206, and $P_3$ 208 send checkpoint messages 224 to the coordinator process 202. Although in the illustrated embodiment the participant processes do not send their checkpoint messages 224 until after every participant process has received its respective response messages, in other embodiments, each participant process may send a checkpoint message to the coordinator process 202 after receiving every response message corresponding to that participant's respective probe message, independent of whether other participants have received response messages, or even sent probe messages. For example, participant process $P_3$ 208 might send a checkpoint message after receiving response messages 214. Thus, in this alternative example, $P_3$ 208 might send its checkpoint message before $P_2$ 206 sends its probe message. Alternatively, $P_3$ 208 might send a checkpoint message after $P_2$ 206 has sent its probe messages, but before $P_2$ 206 has received response messages, and so forth.

Once the coordinator process 202 receives checkpoint messages 224 from each participant process, the coordinator process 202 sends continue messages 226 to each participant process. After receiving the continue messages 226 from the coordinator process 202, the participant processes send the contents of their counters 228 to the coordinator process 202. Although in the illustrated embodiment the participant processes send their respective counters 228 at different times, other embodiments may be used. For example, the participant processes might send their respective counters simultaneously with one or more other participant processes.

Next, the coordinator process 202 may send either a reset message or a done message to the participant processes. As will be described in more detail below with reference to FIGS. 4 and 5, the coordinator process 202 determines whether to send the reset message or the done message based on the contents of the counters 228 received from the participant processes. In the illustrated example, the coordinator process 202 sends the reset message 230 to each respective participant process, indicating that the system has not been completely quiesced. After receiving the reset messages 230, the participant processes begin the probing cycle again. Thus, the participant processes send another round of probe messages 232 to every participant process. The probe messages 232 may be similar to or the same as the probe messages 212 sent when the protocol initiated. Thereafter, the probing cycle may follow the same general pattern as described above.

Once the coordinator process 202 determines that all of the relevant messages in the system have been processed, the coordinator process 202 sends done messages 236 to the participant processes indicating the end of the quiescing protocol.

Although the timing chart illustrates one embodiment of a quiescing protocol, it is recognized that there are other embodiments and implementations of the quiescing protocol. For example, in the illustrated embodiment, participant process $P_3$ 208 is the first participant process to send a probe message. In other embodiments, the participant processes may send probe messages simultaneously. Alternatively, other participant process, such as $P_2$ 206 or $P_1$ 204, may be the first participant process to send a probe message.

IV. QUIESCING SYSTEM NODE

Figure 3:
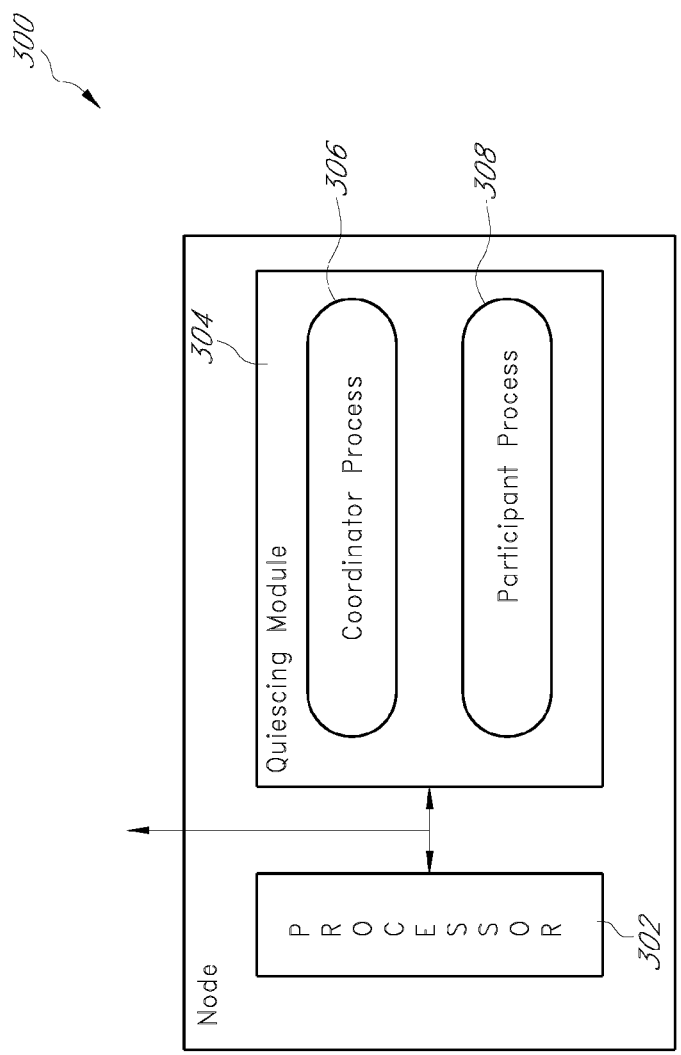
FIG. 3 illustrates one embodiment of a high-level block diagram of one embodiment of a node in the system.

FIG. 3 illustrates the components of one embodiment of a node configured to implement a quiescing protocol. The exemplary node 300 comprises a processor 302 and a quiescing module 304. As illustrated, the processor 302 and the quiescing module 304 communicate with one another and may communicate with modules outside of the node. In order to implement the quiescing protocol, the quiescing module 304 may include multiple processes. In one implementation, the quiescing module 304 may comprise a coordinator process 306 and a participant process 308 which are discussed below in more detail. In other embodiments, the quiescing module 304 may comprise other processes, such as a message-handling process and a message-sending process. These processes comprise different sets of instructions and associated data that execute different logical portions of the quiescing protocol.

Although the exemplary node 300 comprises a quiescing module 304 with both a coordinator process 306 and a participant process 308, in other embodiments a quiescing module 304 for a particular node may comprise only a coordinator process 306 or only a participant process 308. Alternatively, a quiescing module 304 may comprise other processes not illustrated here. Moreover, quiescing modules 304 may be configured differently for each node, some with coordinator processes 306 and others with participant processes 308, or with additional processes not illustrated here, or any combination of the same, and so forth.

In one embodiment, the nodes 300 may run on a variety of computer systems such as, for example, a computer, a server, a smart storage unit, and so forth. In one embodiment, the computer may be a general purpose computer using one or more microprocessors, such as, for example, a Pentium processor, a Pentium II processor, a Pentium Pro processor, a Pentium IV processor, an xx86 processor, an 8051 processor, a MIPS processor, a Power PC processor, a SPARC processor, an Alpha processor, and so forth. The computer may run a variety of operating systems that perform standard operating system functions such opening, reading, writing, and closing a file. It is recognized that other operating systems may be used, such as, for example, Microsoft® Windows® 3.X, Microsoft® Windows 98, Microsoft® Windows® 2000, Microsoft® Windows® NT, Microsoft® Windows® CE, Microsoft® Windows® ME, Palm Pilot OS, Apple® MacOS®, Disk Operating System (DOS), UNIX, IRIX, Solaris, SunOS, FreeBSD, Linux®, or IBM® OS/2® operating systems.

As described above, the exemplary node 300 includes a quiescing module 304. As used herein, the word module refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

V. QUIESCING NODE PROCESSES

In one embodiment, the quiescing module 304 includes a coordinator process 306 and a participant process 308. As described above with reference to FIGS. 1 through 3, these processes may execute on the same node 300 in the system.

A. Coordinator Process

Figure 4:
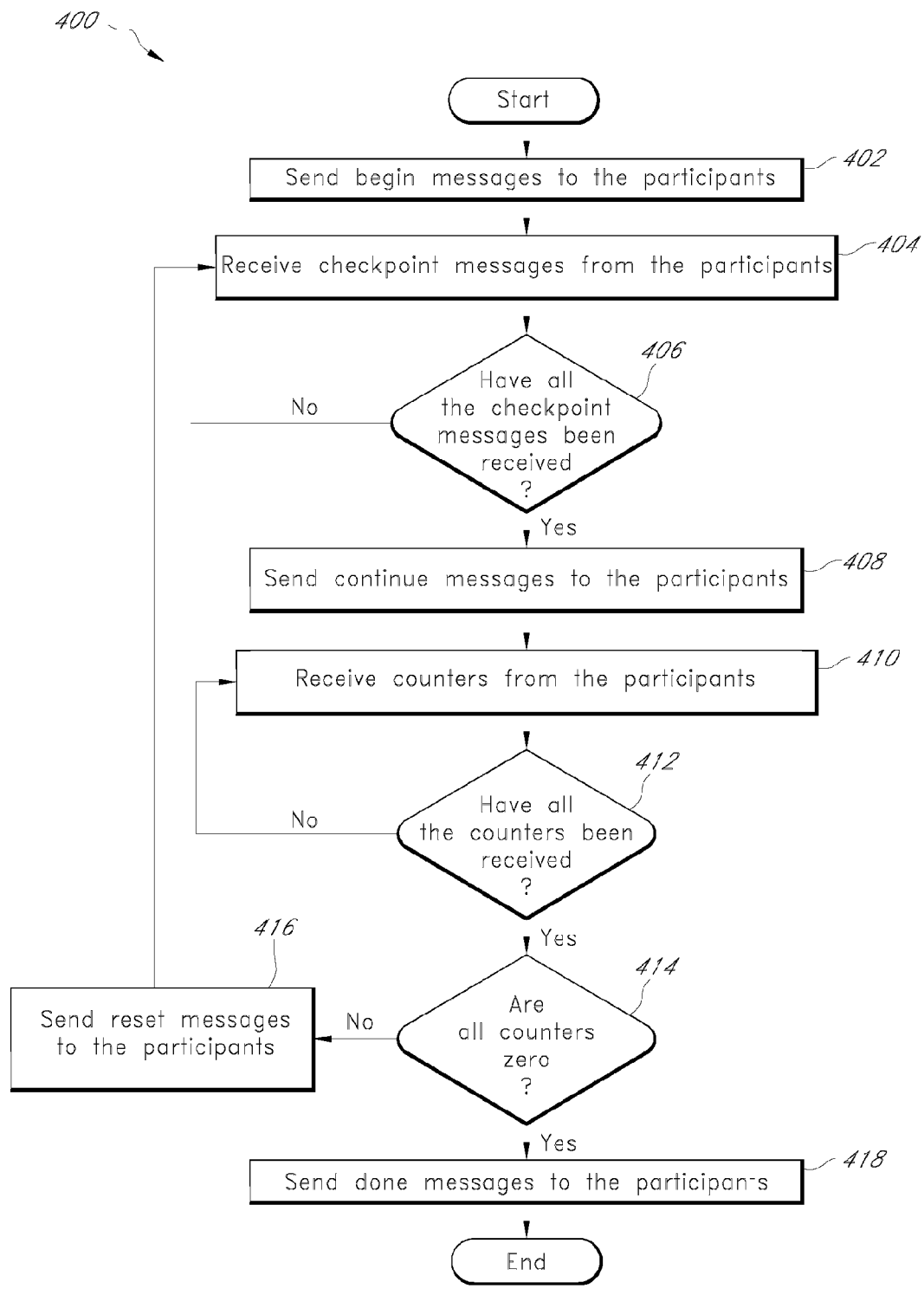
FIG. 4 illustrates one embodiment of a flow chart of a quiescing protocol for a coordinator.

FIG. 4 illustrates a flowchart of one embodiment of a coordinator process 306 for implementing a quiescing protocol. In state 402, the coordinator process 306 sends begin messages to the participants. The participants may be processes executing on all of the nodes in a system or on only a subset of the nodes. In state 404, the coordinator process 306 receives checkpoint messages from the participants. As illustrated in state 406, the coordinator process 306 determines whether the checkpoint messages have been received. If the coordinator process 306 is still waiting for checkpoint messages, the coordinator process 306 continues to receive checkpoint messages from participants 404, until the coordinator process 306 determines that the checkpoint messages have been received 406. In state 408, the coordinator process 306 sends messages to the participants to continue.

Next, in state 410, the coordinator process 306 receives counters from the participants. The counters may include the contents of counting variables maintained by the participants or a flag variable. As discussed above, when a participant process receives a relevant message during the quiescing protocol, the participant process increments its counter. Similar to states 404 and 406, states 410 and 412 operate a loop until all counters have been received. When the coordinator process 306 determines that all counters have been received 412, then the coordinator process 306 determines whether all of the counters from the participant processes are zero 414. If any of the counters from the participant processes have a non-zero value, then the coordinator process 306, sends reset messages to the participants 416, and begins to wait for checkpoint messages triggered by the probing cycle that reset in each participant process 404. This cycle may repeat as many times as necessary to allow the existing messages to be processed by the system. Eventually, the probing cycle will yield a collection of counters that all have the value of zero indicating that all messages have been processed. Once the coordinator process 306 determines that all of the counters are zero 414, the coordinator process 306 sends done messages to the participants 418.

In another embodiment, the coordinator process 306 takes the counter values from the participants, sums the values, and returns the sum to the participants. If the sum is not zero, then the participants know to reset their counters and restart the probing cycle. If the sum is zero, then the participants know that all of the messages have been processed by the system such that the system is ready to be disabled. In another embodiment, the participant processes send a Boolean value, indicating whether or not their respective counters are zero, rather than sending the actual count of their counter variables. In embodiments where the counters are implemented as Boolean values, the participants may send these values, and the coordinator process 306 may sum the values or check each individual Boolean counter to determine if a relevant message was counted. It will be appreciated that there are many variations for keeping track of whether relevant messages were received during the quiescing protocol.

It is recognized that FIG. 4 illustrates one embodiment of a coordinator process 306 and that other implementations of the coordinator process 306 may be used.

B. Participant Process

Figure 5A:
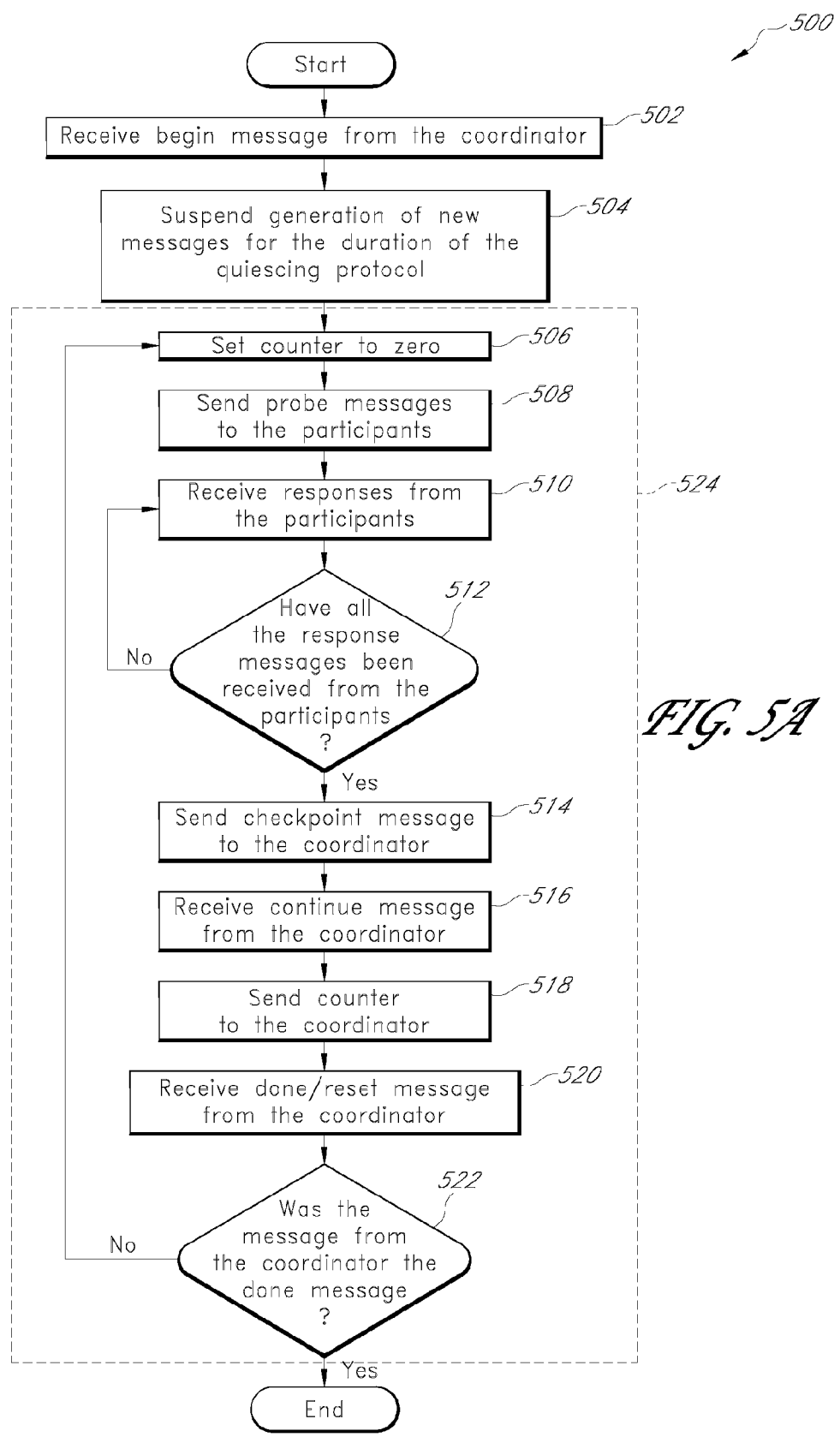
FIGS. 5A, 5B, and 5C illustrate embodiments of flow charts of a quiescing protocol for a participant.
Figure 5B:
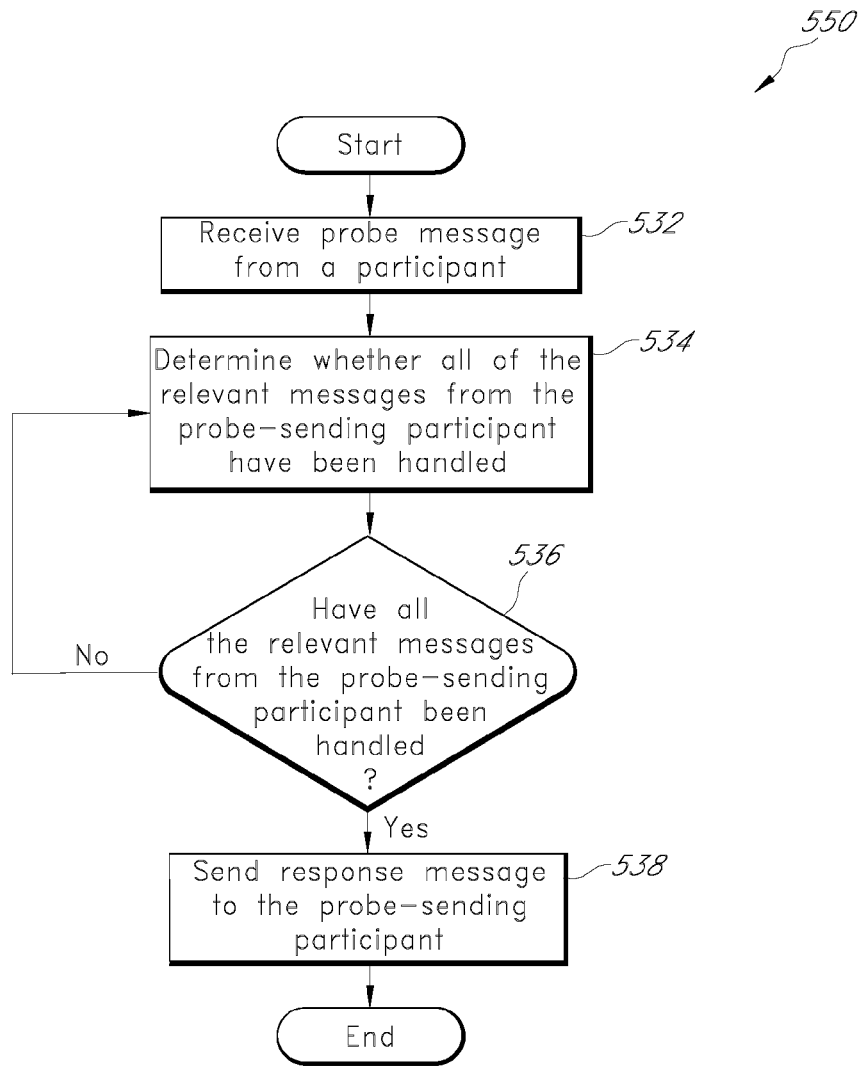
Figure 5C:
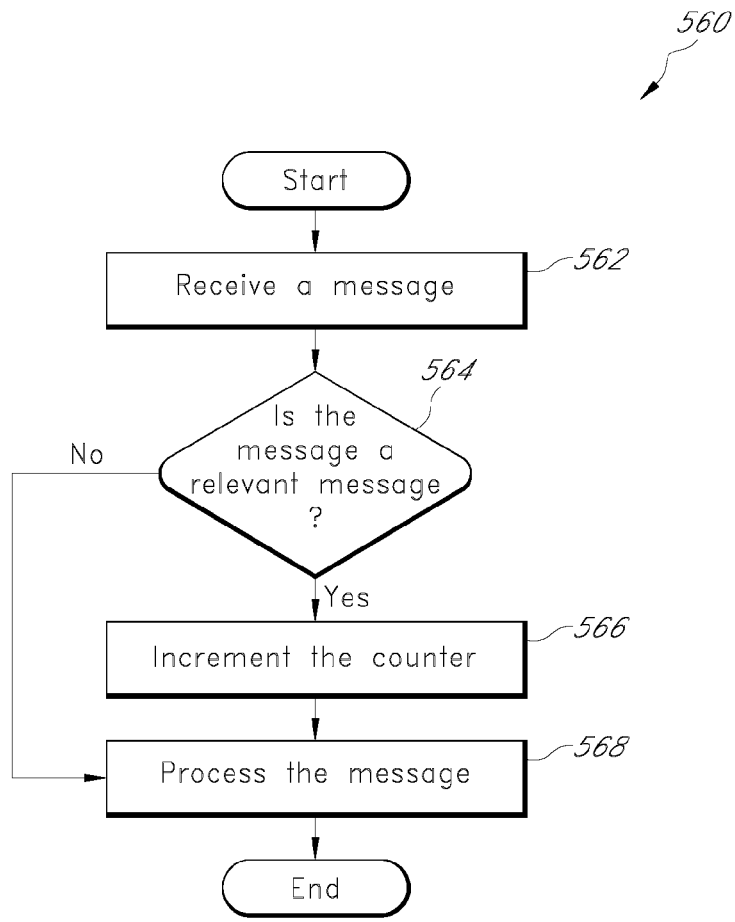

FIGS. 5A, 5B, and 5C illustrate embodiments of combined operations of a participant process 308 during the quiescing protocol. FIG. 5A illustrates one embodiment of a probe-sending process of the participant process. FIGS. 5B and 5C illustrate embodiments of other operations that implement the quiescing protocol. These operations respond to the messages and activities of participants. One or more of the operations illustrated in FIGS. 5B and 5C may be implemented as part of another process, such as, for example, a message-handling process. In some embodiments, the participant process may be broken into several different processes, including a message-handling process and a message-sending process. In the illustrated embodiment, these operations are grouped together into a single participant process that runs at least in part in parallel, though other embodiments may be used. The operations are illustrated separately to simplify the logical flow of the component operations.

1. Probe-Sending Process

FIG. 5A illustrates one embodiment of a probe-sending process of a participant process. With reference to FIG. 5A, the participant process 308 receives messages from the coordinator indicating that the quiescing protocol is to begin 502. Next, in state 504, the participant process 308 suspends the generation of relevant messages for the duration of the quiescing protocol. Messages may be categorized as either relevant messages or nonrelevant messages. Relevant messages are those messages that change the state of the system. Relevant messages are suspended because messages that change the state of the system are the messages that need to be stabilized during the quiescing protocol. Once the relevant messages have been completed, then the system has reached a consistent state. In one embodiment, the messages initiated by the quiescing protocol are non-relevant messages because they do not change the state of the system.

The following illustrates an example probing cycle 524. In state 506, the participant process 308 sets its counter to zero. As described in more detail below with reference to FIG. 5C, when a relevant message is received by the participant process 308, the participant process 308 increments its counter by one, though in other embodiments, a flag, such as a binary flag, may be used. Then, in state 508, the participant process 308 sends probe messages to the participants, including itself. As described in detail, with reference to FIG. 2, the probe messages may be sent to the participants in a variety of combinations. After sending probe messages to the participants, each participant process 308 waits to receive all of the response messages from the participants. This waiting period is illustrated in states 510 and 512. In state 510, the participant process 308 receives responses from the participants. Then, in state 512, the participant process 308 determines whether the response messages have been received from the participants. If they have not all been received, the participant process 308 returns to state 510, waiting for additional response messages from the remaining non-responding participants.

Once the participant process 308 has determined that the response messages have been received, the participant process 308 sends a checkpoint message to the coordinator 514. Then, in state 516, the participant process 308 receives a continue message from the coordinator. In some embodiments there may be some delay between the sending of the checkpoint message and the receiving of the continue message because the coordinator does not send the continue message until it has received checkpoint message from all of the participants. In state 518, the participant process 308 sends the contents of its counter to the coordinator. Then, in state 520, the participant process 308 waits to receive either the done message or the reset message from the coordinator. If the coordinator has determined that the system is quiesced, then the coordinator sends the done message, indicating to the participant processes that the quiescing protocol is finished. If, however, the coordinator determines that the system is not quiesced 522, then the coordinator sends a reset message to the participant processes, indicating that the probing cycle should be repeated. If the participant process 308 receives the reset message from the coordinator, then the participant process returns to state 506, setting its counter to zero, and then proceeds to send probe messages to the participants 508, and so forth. The operations from state 506 through 522 are referred to as the elements of the probing cycle 524. Once the participant process 308 receives the done message from the coordinator, the probing cycle is exited.

As set forth above, in other embodiments, the participant process 308 may receive from the coordinator a sum of the counters of all of the participants. If the sum is not zero, then the participant process 308 returns to state 506, setting its counter to zero, and then proceeds to send probe messages to the participants 508, and so forth. If the sum is zero, then the participant process exits the probing cycle and proceeds to the end state.

2. Probe-Response Process

FIG. 5B illustrates one embodiment of a probe-response process of a participant process 308. FIG. 5B illustrates a probe-response process that the participant process executes in addition to the probe-sending process described above with reference to FIG. 5A. This flowchart illustrates the operations taken by each participant process when it receives a probe message from a participant process, including itself. In one embodiment, the probe-response process may run in parallel with the probe-sending process.

In state 532, the participant process 308 receives a probe message from a participant, including itself. In state 534, the participant process 308 determines whether all relevant messages from the probe-sending participant have been handled. If all of the relevant messages from the probe-sending participant have been handled, as illustrated in decision state 536, then the participant process 308 sends a response message to the probe-sending participant, as illustrated in state 538. If, on the other hand, the participant process 308 determines that all of the relevant messages from the probe-sending participant have not been handled, then the participant process 308 proceeds back to state 534 where it determines again whether all of the relevant messages from the probe-sending participant have been handled. This loop continues until the participant process 308 determines that all of the relevant messages from the probe-sending participant have been handled. The effect of the probe-response process described above is to ensure that responses to probe messages are not sent until the participant process 308 has handled all of the relevant messages from the probe-sending participant.

In one embodiment, messages are received into a queue and processed in the order that they are received. Thus, if a participant process 308 processes messages from a queue and receives a probe message, it can be assumed that all messages received from the probe-sending participant before the probe message was sent have been handled since all messages in the queue received before the probe message have been handled.

As set forth above, while the probing cycle is described above, it is recognized that in other embodiments, other methods may be used to ensure that all of the messages sent have been handled between the time the counter is reset and the time the checkpoint message is sent to the coordinator.

3. Counter Process

FIG. 5C illustrates one embodiment of a counter process of the participant process. FIG. 5C illustrates how each participant process 308 handles the receipt of relevant messages during the quiescing protocol. In state 562, the participant process 308 receives a message from a participant, which may be itself. After receiving a message from a participant, the participant process 308 determines whether the message is a relevant message 564. If it is a relevant message, then the participant process 308 increments its counter 566 or sets its flag. After incrementing its counter, the participant process 308 processes the message 568. If, however, the message is determined not to be a relevant message, then the participant process 308 processes the message without incrementing its counter.

In other embodiments, rather than process the message, the message is added to the queue to be processed. In other embodiments, the counter process may count the relevant messages sent, rather than the relevant messages received. In this embodiment, the participants would count relevant messages sent after their counters were reset at the initiation of the probing cycle.

In some embodiments, the counter process may also process messages received from non-participant nodes and/or other components of the system. Moreover, the counter process may operate during different periods of time, according to different embodiments. For example in some embodiments, the counting process may run in conjunction with the probing cycle, as described above with reference to FIG. 5A. In other embodiments, the counting process may operate in parallel during the execution of the entire quiescing protocol, or even before and/or after the quiescing protocol.

It will be appreciated by one skilled in the art that there are many ways to implement the processes described in FIGS. 5A, 5B, and 5C. For example, the processes may be implemented as subroutines or as separate programming threads.

VI. EXAMPLE APPLICATION

An example application of the quiescing protocol will now be described in the context of a distributed file system. The exemplary distributed file system includes nodes and resources. Since all nodes in a cluster share the same resources, they need to make sure that their use of a resource does not conflict with any others cluster-wide. Accordingly, each resource is assigned an ID as well as a resource coordinator that coordinates access to that particular resource. These assignments are stored as a mapping that maps the resource's ID to a resource coordinator.

To control access to the resources, the resource coordinators employ a "locking" protocol. To use a resource, a client thread first acquires a lock on that resource. When a client thread needs a lock, it will use the mapping to find the resource coordinator for the requested resource and send a lock request to that resource coordinator.

Problems may occur, however, when a change needs to be made to the mapping. Changes to the mapping may occur, for example, when nodes are added to or removed from the cluster. The mapping cannot just change in an ad hoc fashion since at any point in time there are lock requests that are waiting to be processed and lock requests that are being created that use the old mapping. Accordingly, in one embodiment, the cluster may be quiesced such that all new lock requests are suspended, all pending lock requests are processed, the old mapping is replaced with the new mapping, and the new lock requests resume using the new mapping. In order to ensure that the new lock requests are suspended and all pending lock requests are processed, the cluster may implement the quiescing protocol discussed above.

A. Removal of a Node

Figure 6A:
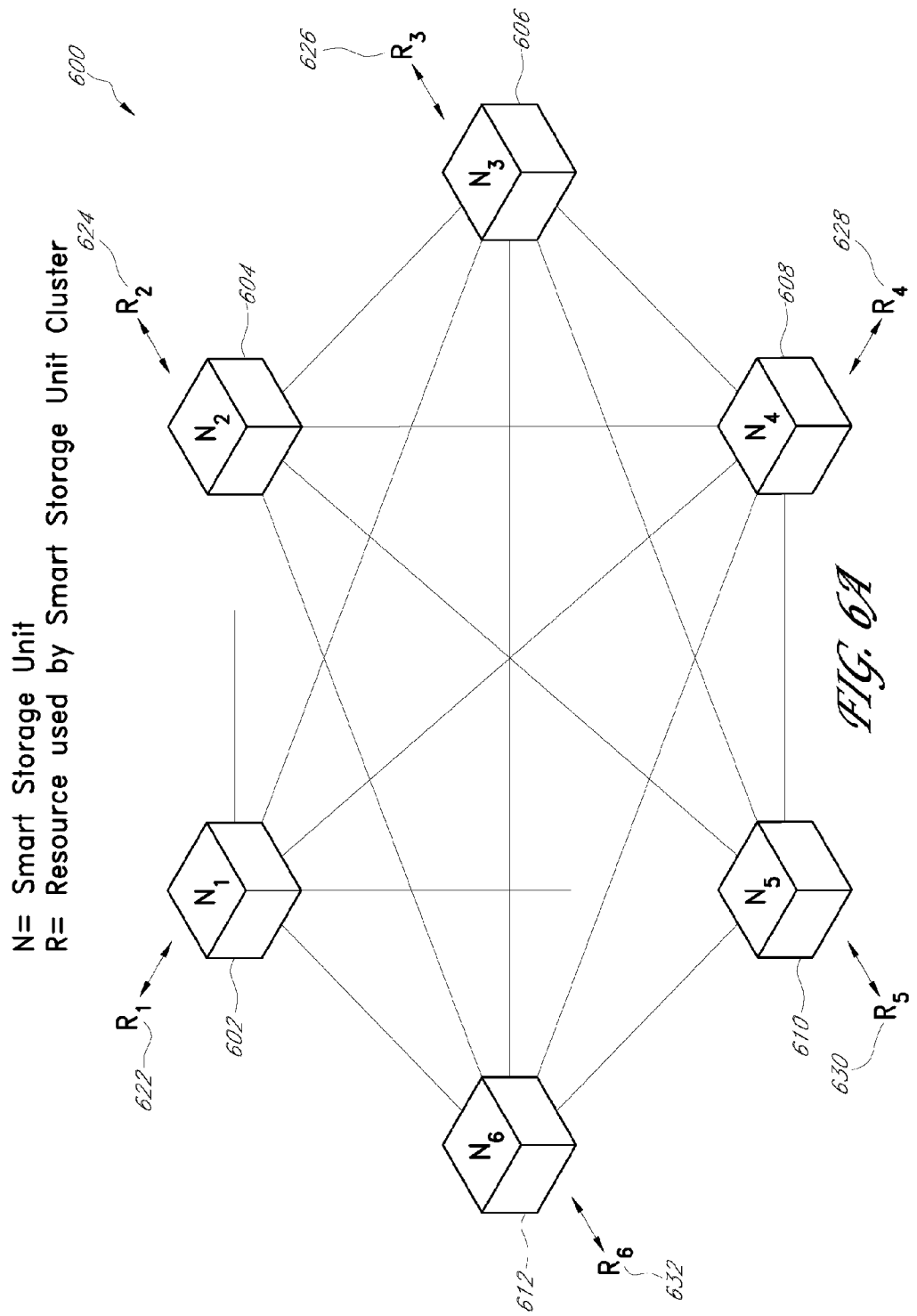
FIGS. 6A, 6B, and 6C illustrate embodiments of a high-level block diagram of one embodiment of set of smart storage units in a distributed file system.
Figure 6B:
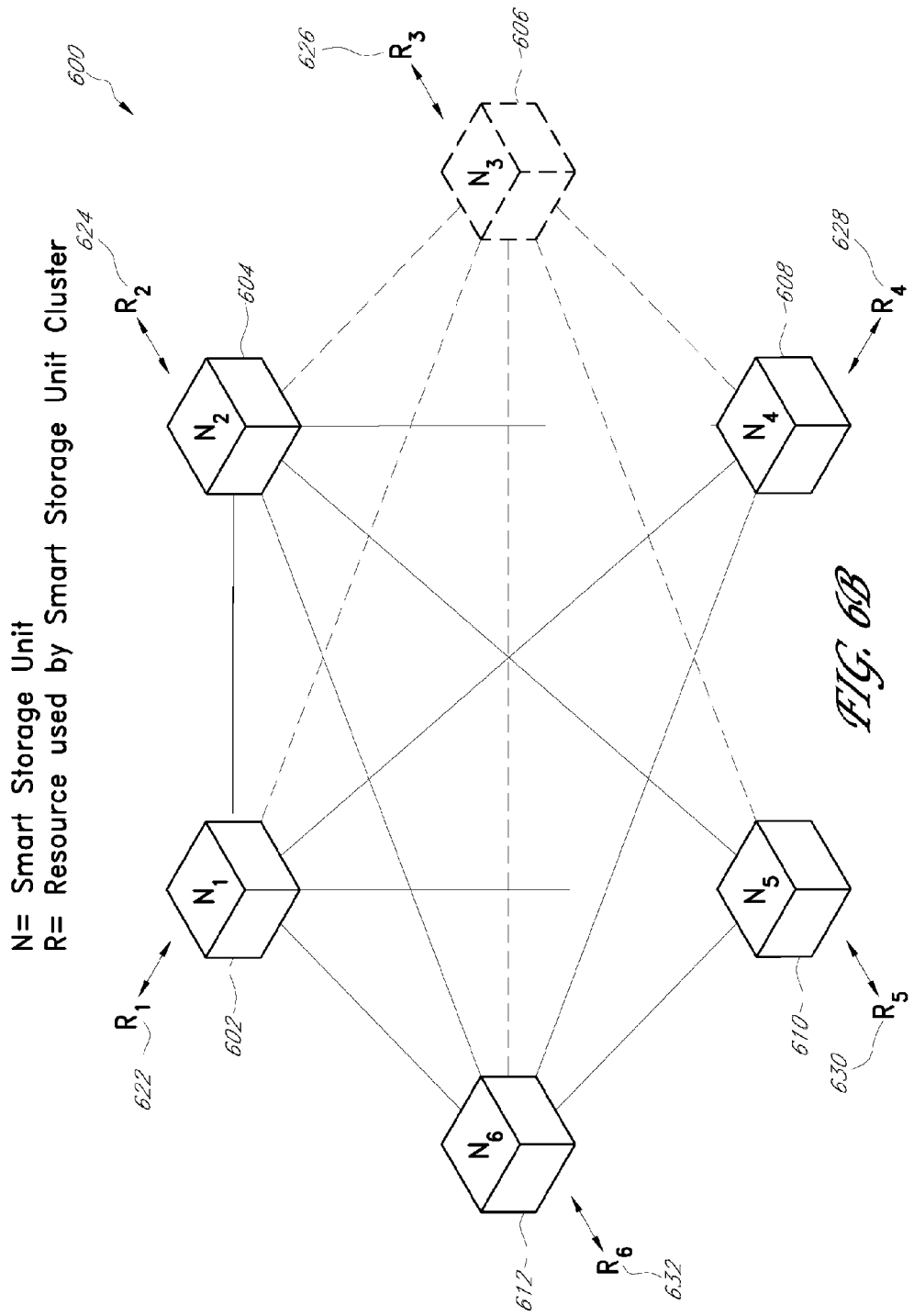
Figure 6C:
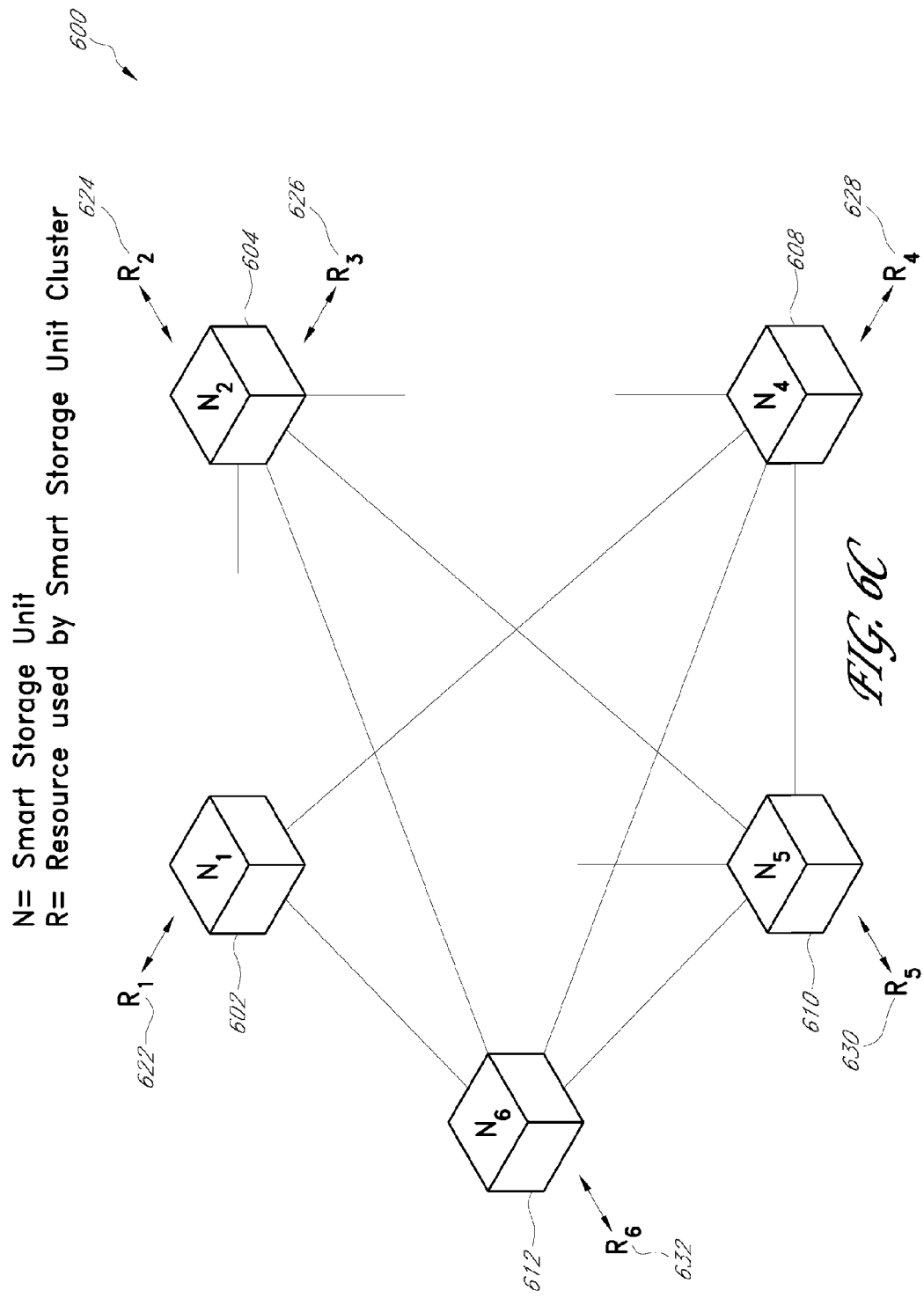
Figure 7:
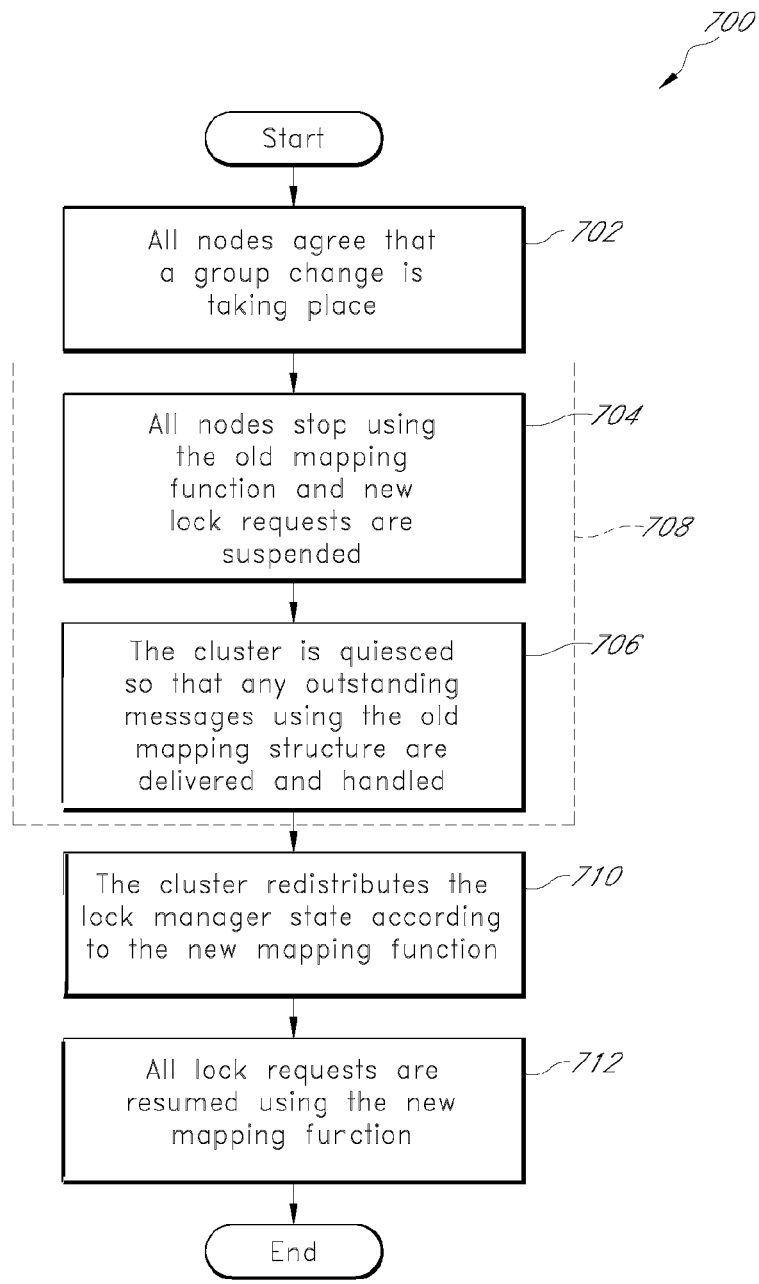
FIG. 7 illustrates one embodiment of a flow chart for mapping a change to resource assignments in a distributed system.

FIGS. 6A, 6B, and 6C illustrate embodiment of the removal of a node from a cluster, which prompts a change to reassign the resource for which the removed node had been the coordinator. FIG. 7 illustrates a flowchart describing the steps taken to execute a group change, including the quiescing of the system.

FIG. 6A illustrates one embodiment of a smart storage unit cluster 600. The cluster 600 is arranged in a fully connected topology. The cluster 600 comprises six nodes: $N_1$ 602, $N_2$ 604, $N_3$ 606, $N_4$ 608, $N_5$ 610, and $N_6$ 612. Each node is also associated with a corresponding resource, respectively: $R_1$ 622, $R_2$ 624, $R_3$ 626, $R_4$ 628, $R_5$ 630, and $R_6$ 632. In the illustrated embodiment, each node is the coordinator for its associated resource. Although in the illustrated embodiment each node is associated with exactly one resource, in other embodiments one node may be associated with multiple resources or with no resources at all. Thus, in some embodiments, some nodes may be the coordinator for multiple resources and/or some nodes may not be coordinators for any resource. In addition, some resources may be associated with one or more nodes. A more detailed description of various embodiments of smart storage unit are disclosed in the patent applications incorporated by reference above.

FIG. 6B illustrates one embodiment of the status of the interconnections of a cluster 600 during a group change. In the illustrated embodiment, smart storage unit $N_3$ 606 is removed from or loses communication with the smart storage unit cluster 600. The dashed lines indicate the removal of the smart storage unit $N_3$ as well as the break in communication with the remaining smart storage units. Once smart storage unit $N_3$ has been removed from the cluster 600, the remaining nodes reassign the responsibility for resource $R_3$ 626, which was previously managed by $N_3$ 606. This reassignment of responsibilities is called a group change.

FIG. 6C illustrates one embodiment of the makeup of cluster 600, following the group change. The cluster now comprises five smart storage units, respectively $N_1$ 602, $N_2$ 604, $N_4$ 608, $N_5$ 610, and $N_6$ 612. Four of the nodes in the cluster 600 retain their original assignments as coordinators for the respective resources. Smart storage unit $N_2$ 604, however, has been reassigned as the coordinator for $R_3$. Thus, smart storage unit $N_2$ 604 is now the coordinator for both $R_2$ and $R_3$. In order to reassign resources from FIG. 6A to 6C, it is preferable that the system is quiesced before such changes are made.

B. Mapping Change

FIG. 7 illustrates one embodiment of a process 700 for implementing a change to the resource assignments. In state 702, all available nodes agree that a group change is taking place. Then, in state 704, all nodes stop using the old mapping function and new lock requests are suspended. Then, in state 706, the cluster is quiesced so that any outstanding messages using the old mapping structure are delivered and handled. States 704 and 706, collectively, represent the quiescing protocol 708. Thus, the flowcharts described above with reference to FIGS. 4, 5A, 5B, and 5C may be used to execute states 704 and 706 in an exemplary group change application. Once the quiescing protocol has been executed, in state 710, the cluster redistributes the lock manager state according to the new mapping function. Finally, in state 712, all lock requests are resumed using the new mapping function.

C. Exemplary Code

The following is exemplary code for implementing a change to the resource assignments.

```
static int
rtxn_sync_locks_prepare(const struct gmp_info *old_gi,
    const struct gmp_info *new_gi, enum rtxn_sync_locks_state
    *state)
{
    int cont, error;
    u_int64_t lk_recv_count;
    /* Suspend initiator side. New messages will be generated by
     * lk_lock, lk_unlock, etc. However, messages in response to
     * other messages will still be generated. */
    lk_group_change_suspend_api( );
    /* Drain locks. */
    cont = 1;
    do {
        /* Remember the old receive count. */
        lk_recv_count = lk_get_recv_count( );
        /* Do probe. */
        error = rtxn_probe(&new_gi->up_nodes);
        if (error) {
            INOTICE("error %d from %s", error,
                function_name(rtxn_probe));
            rtxn_abort( );
            return 0;
        }
        /* Do checkpoint. */
        if (!rtxn_checkpoint(0))
            return 0;
        /* Do another checkpoint, this time sending
         * whether or not we received any messages.
         * The coordinator will sum all of the 'cont's
         * that it receives from participants. */
        cont = lk_recv_count != lk_get_recv_count( );
        if (!rtxn_checkpoint(&cont))
            return 0;
    } while (cont);
    return 1;
}
u_int64_t
lk_get_recv_count(void)
{
    mtx_lock(&g_lk.lock);
    u_int64_t ret = g_lk.recv_count;
    mtx_unlock(&g_lk.lock);
    return ret;
}
void
handle_lk_lock_request(struct dev_local_ctx *dl_ctx,
    enum lk_domain_type domain, const u_int8_t resource[ ],
    u_int type, int waiter_token)
{
    struct lk_domain *ld = &lk_domains[domain];
    mtx_lock(&g_lk.lock);
    g_lk.recv_count++;
    lk_recv_lock_request(ld, dl_ctx->devid, resource, type,
        waiter_token);
    mtx_unlock(&g_lk.lock);
}
void
handle_lk_lock_response(struct dev_local_ctx *dl_ctx,
    enum lk_domain_type domain, const u_int8_t resource[ ],
    const struct int_set *tokens)
{
    struct lk_domain *ld = &lk_domains[domain];
    mtx_lock(&g_lk.lock);
    g_lk.recv_count++;
    lk_recv_lock_response(ld, dl_ctx->devid, resource, tokens);
    mtx_unlock(&g_lk.lock);
}
```

VII. CONCLUSION

While certain embodiments of the invention have been described, these embodiments have been presented by way of example only, and are not intended to limit the scope of the present invention. Accordingly, the breadth and scope of the present invention should be defined in accordance with the following claims and their equivalents.

What is claimed is:

1. A distributed system configured to quiesce a set of messages, the distributed system comprising:
    a plurality of nodes, each node comprising one or more physical processors;
    a first subset of two or more of the plurality of nodes, each node of the first subset further comprising a participant process;
    a second subset of one or more of the plurality of nodes, each node of the second subset further comprising a coordinator process; and
    a set of messages sent and received by the plurality of nodes, the set of messages comprising:
        a relevant message which changes a state of the distributed system;
        a probe message which requests a probe-response message;
        the probe-response message which indicates that the sender has processed all received relevant messages from the recipient;
        a checkpoint message which indicates that the sender has received a probe-response message from each of the plurality of nodes;
        a continue message requesting a continue-response message; and
        the continue-response message which indicates whether the sender has received a relevant message from one or more of the plurality of nodes;
    wherein each participant process is configured to, when executed by at least one node of the first subset:
        suspend generation of relevant messages;
        maintain received-message information which indicates whether a relevant message has been received from the plurality of nodes;
        send probe messages to each of the plurality of nodes;
        receive probe-response messages from each of the plurality of nodes;
        receive probe messages from each of the plurality of nodes; and
        for each probe message received, send the probe-response message to the node which sent the probe message; and
    wherein each coordinator process is configured to, when executed by at least one node of the second subset:
        receive checkpoint messages from each of the plurality of nodes;
        send continue messages to each of the plurality of nodes;
        receive continue-response messages from each of the plurality of nodes; and
        based on the received continue-response messages, determine whether the distributed system has been quiesced.

2. The distributed system of claim 1, wherein the first subset and the second subset are the same.

3. The distributed system of claim 2, wherein both the first subset and the second subset comprise all of the plurality of nodes.

4. The distributed system of claim 2, wherein the participant process and the coordinator process are implemented as a single module.

5. The distributed system of claim 1, wherein the first subset and the second subset are different.

6. The distributed system of claim 1, wherein the first subset comprises all of the plurality of nodes.

7. A distributed system configured to quiesce a set of messages, the distributed system comprising:
    a plurality of nodes, each node comprising at least one physical processor; and
    one or more executable coordinator processes, each coordinator process configured to, when executed by one or more of the plurality of nodes:
        receive one or more first messages from one or more of the plurality of nodes, each first message indicating that the node, which has sent that first message, has sent a second message to each of the plurality of nodes and has received a third message from each of the plurality of nodes, wherein the second message is a message requesting the third message, and wherein the third message indicates that all messages that change a state of the distributed system previously received by the node, which has received that second message, from the node, which has sent that second message, have been processed;
        in response to receiving the one or more first messages, send fourth messages to the plurality of nodes, wherein each fourth message is a message requesting a fifth message;
        receive one or more fifth messages from one or more of the plurality of nodes in response to the fourth messages, each fifth message indicating whether the node, which has sent that fifth message, has received a message that changes a state of the distributed system; and
        based on one or more received fifth messages, determine whether the distributed system has been quiesced by determining whether any of the plurality of nodes have received any new messages that change a state of the distributed system; and
        when it is determined that any of the plurality of nodes received a new message that changes a state of the distributed system, sending and receiving additional messages until it is determined from one or more received messages that none of the plurality of nodes have received any new messages that change a state of the distributed system.

8. The distributed system of claim 7, wherein each of the plurality of nodes further comprises one of the one or more executable coordinator processes.

9. The distributed system of claim 7, wherein the plurality of nodes includes at least one coordinator node, the coordinator node further comprising one of the one or more executable coordinator processes.

10. The distributed system of claim 9, wherein sending the fourth messages includes sending a remote message to at least one of the plurality of nodes, and receiving the one or more first messages and fifth messages includes receiving a remote message from at least one of the plurality of nodes.

11. The distributed system of claim 10, wherein sending the fourth messages further includes sending a local message to the coordinator node, and receiving the one or more first messages and fifth messages further includes receiving a local message from the coordinator node.

12. The distributed system of claim 7, wherein the fifth message comprises information about the number of messages that change a state of the distributed system which have been received by the node which has sent the fifth message.

13. The distributed system of claim 7, wherein the fifth message comprises a Boolean value.

14. A distributed system configured to quiesce a set of messages, the distributed system comprising:
- a plurality of nodes, each node comprising at least one physical processor and at least one executable software module;
- wherein the at least one executable software module of each of the plurality of nodes is configured to, when executed by the at least one physical processor:
  - suspend generation of new messages that change a state of the distributed system;
  - maintain received-message information which indicates whether a message that changes a state of the distributed system has been received from the plurality of nodes;
  - send first messages to the plurality of nodes, each first message requesting a response;
  - receive one or more second messages from one or more of the plurality of nodes, each second message indicating that all messages which change a state of the distributed system sent by the node, which received the second message, to the node, which sent the second message, have been processed;
  - receive one or more third messages from one or more of the plurality of nodes, each third message requesting a response;
  - for each third message received, send a fourth message to the node, which sent the third message, each fourth message indicating that all messages which change a state of the distributed system sent by the node, which sent the third message, to the node, which received the third message, have been processed;
  - determine whether the distributed system has been quiesced at least in part by determining whether any of the plurality of nodes have received any new messages that change a state of the distributed system; and
  - when it is determined that any of the plurality of nodes received a new message that changes a state of the distributed system, sending and receiving additional messages until it is determined that none of the plurality of nodes have received any new messages that change a state of the distributed system.

15. The distributed system of claim 14, wherein sending the first message and fourth messages includes sending a remote message to at least one of the plurality of nodes, and receiving the one or more second messages and third messages includes receiving a remote message from at least one of the plurality of nodes.

16. The distributed system of claim 14, wherein sending the first messages and fourth message includes sending a local message to the node which is sending the first messages and fourth message, and receiving the one or more second messages and third messages includes receiving a local message from the node which is receiving the one or more second messages and third messages.

17. The distributed system of claim 14, wherein the received-message information comprises the number of messages that change a state of the distributed system which have been received from the plurality of nodes.

18. The distributed system of claim 14, wherein the received-message information comprises a Boolean value.

* * * * *